(12) United States Patent
Ji et al.

(10) Patent No.: US 8,547,951 B2
(45) Date of Patent: *Oct. 1, 2013

(54) CHANNEL STRUCTURES FOR A QUASI-ORTHOGONAL MULTIPLE-ACCESS COMMUNICATION SYSTEM

(75) Inventors: Tingfang Ji, San Diego, CA (US); Ayman Naguib, San Diego, CA (US); Arak Sutivong, San Diego, CA (US); Dhananjay Ashok Gore, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/791,702

(22) Filed: Jun. 1, 2010

(65) Prior Publication Data

US 2010/0238902 A1 Sep. 23, 2010

Related U.S. Application Data

(63) Continuation of application No. 11/129,140, filed on May 13, 2005.

(60) Provisional application No. 60/662,634, filed on Mar. 16, 2005.

(51) Int. Cl.
| | |
|---|---|
| H04W 4/00 | (2009.01) |
| H04W 72/00 | (2009.01) |
| H04B 7/216 | (2006.01) |
| H04B 7/00 | (2006.01) |
| H04B 1/00 | (2006.01) |
| H04J 1/00 | (2006.01) |

(52) U.S. Cl.
USPC ........... 370/342; 370/329; 370/330; 455/450; 455/452.2; 455/453; 455/526; 375/132; 375/134

(58) Field of Classification Search
USPC .............. 370/329, 330, 342; 455/450, 452.2, 455/453, 526; 375/132, 134
See application file for complete search history.

(56) References Cited

U.S. PATENT DOCUMENTS

| | | | |
|---|---|---|---|
| 4,393,276 | A | 7/1983 | Steele |
| 4,554,668 | A | 11/1985 | Deman et al. |

(Continued)

FOREIGN PATENT DOCUMENTS

| | | |
|---|---|---|
| CA | 2348137 | 11/2001 |
| CA | 2477536 | 9/2003 |

(Continued)

OTHER PUBLICATIONS

Blum, R. et al: "On Optimum Mimo with Antenna Selection," IEEE International Conference on Communications: Conference Proceedings, vol. 1, Apr. 28, 2002, pp. 386-390.

(Continued)

Primary Examiner — Ariel Balaoing
(74) Attorney, Agent, or Firm — Stanton Braden

(57) ABSTRACT

A channel structure has at least two channel sets. Each channel set contains multiple channels and is associated with a specific mapping of the channels to the system resources available for data transmission. Each channel set may be defined based on a channel tree having a hierarchical structure. To achieve intra-cell interference diversity, the channel-to-resource mapping for each channel set is pseudo-random with respect to the mapping for each remaining channel set. In each scheduling interval, terminals are scheduled for transmission on the forward and/or reverse link. The scheduled terminals are assigned channels from the channel sets. Multiple terminals may use the same system resources and their overlapping transmissions may be separated in the spatial domain. For example, beamforming may be performed to send multiple overlapping transmissions on the forward link, and receiver spatial processing may be performed to separate out multiple overlapping transmissions received on the reverse link.

40 Claims, 11 Drawing Sheets

(56) References Cited

U.S. PATENT DOCUMENTS

| | | |
|---|---|---|
| 4,747,137 A | 5/1988 | Matsunaga |
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany |
| 5,406,551 A | 4/1995 | Saito et al. |
| 5,410,538 A | 4/1995 | Roche et al. |
| 5,455,839 A | 10/1995 | Eyuboglu |
| 5,465,253 A | 11/1995 | Rahnema |
| 5,491,727 A | 2/1996 | Petit |
| 5,513,379 A | 4/1996 | Benveniste et al. |
| 5,539,748 A | 7/1996 | Raith |
| 5,548,582 A | 8/1996 | Brajal et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang |
| 5,838,268 A | 11/1998 | Frenkel |
| 5,867,478 A | 2/1999 | Baum et al. |
| 5,870,393 A | 2/1999 | Yano et al. |
| 5,887,023 A | 3/1999 | Mabuchi |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,949,814 A | 9/1999 | Odenwalder et al. |
| 5,953,325 A | 9/1999 | Willars |
| 5,955,992 A | 9/1999 | Shattil |
| 5,956,642 A | 9/1999 | Larsson et al. |
| 5,995,992 A | 11/1999 | Eckard |
| 5,999,826 A | 12/1999 | Whinnett |
| 6,002,942 A | 12/1999 | Park |
| 6,016,123 A | 1/2000 | Barton et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng |
| 6,075,797 A | 6/2000 | Thomas |
| 6,076,114 A | 6/2000 | Wesley |
| 6,088,345 A | 7/2000 | Sakoda et al. |
| 6,108,323 A | 8/2000 | Gray |
| 6,108,550 A | 8/2000 | Wiorek et al. |
| 6,112,094 A | 8/2000 | Dent |
| 6,128,776 A | 10/2000 | Kang |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,175,550 B1 | 1/2001 | Van Nee |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous |
| 6,654,339 B1 | 11/2003 | Bohnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng |
| 6,675,012 B2 | 1/2004 | Gray |
| 6,678,318 B1 | 1/2004 | Lai |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Rajiv et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,813,284 B2 | 11/2004 | Vayanos et al. |
| 6,821,535 B2 | 11/2004 | Nurmi et al. |

| Patent No. | Date | Inventor |
|---|---|---|
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,934,266 B2 | 8/2005 | Dulin et al. |
| 6,934,275 B1 | 8/2005 | Love et al. |
| 6,934,340 B1 | 8/2005 | Dollard |
| 6,940,827 B2 | 9/2005 | Li et al. |
| 6,940,842 B2 | 9/2005 | Proctor, Jr. |
| 6,940,845 B2 | 9/2005 | Benveniste |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,023,880 B2 | 4/2006 | El-Maleh et al. |
| 7,039,356 B2 | 5/2006 | Nguyen |
| 7,039,370 B2 | 5/2006 | Laroia et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi |
| 7,209,712 B2 | 4/2007 | Holtzman |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji |
| 7,257,423 B2 | 8/2007 | Iochi |
| 7,260,153 B2 | 8/2007 | Nissani et al. |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen |
| 7,418,043 B2 | 8/2008 | Shattil |
| 7,418,246 B2 | 8/2008 | Kim et al. |
| 7,423,991 B2 | 9/2008 | Cho et al. |
| 7,426,426 B2 | 9/2008 | Van Baren |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |

| Patent/Publication | Date | Inventor(s) |
|---|---|---|
| 7,447,270 B1 | 11/2008 | Hottinen |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,735 B2 | 2/2009 | Dubuc et al. |
| 7,492,788 B2 | 2/2009 | Zhang et al. |
| 7,499,393 B2 | 3/2009 | Ozluturk |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,573,900 B2 | 8/2009 | Kim et al. |
| 7,599,327 B2 | 10/2009 | Zhuang |
| 7,616,955 B2 | 11/2009 | Kim |
| 7,623,442 B2 | 11/2009 | Laroia et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,768,979 B2 | 8/2010 | Sutivong et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,014,271 B2 | 9/2011 | Laroia et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,295,154 B2 | 10/2012 | Laroia et al. |
| 2001/0024427 A1 | 9/2001 | Suzuki |
| 2001/0030948 A1 | 10/2001 | Tiedemann, Jr. |
| 2001/0055294 A1 | 12/2001 | Motoyoshi |
| 2002/0015405 A1 | 2/2002 | Sepponen et al. |
| 2002/0018157 A1 | 2/2002 | Zhang et al. |
| 2002/0044524 A1 | 4/2002 | Laroia et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan |
| 2002/0128035 A1 | 9/2002 | Jokinen et al. |
| 2002/0159422 A1 | 10/2002 | Li et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2003/0002464 A1 | 1/2003 | Rezaiifar et al. |
| 2003/0035491 A1 | 2/2003 | Walton et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0076890 A1 | 4/2003 | Hochwald et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0112745 A1 | 6/2003 | Zhuang et al. |
| 2003/0125040 A1 | 7/2003 | Walton et al. |
| 2003/0142648 A1 | 7/2003 | Semper |
| 2003/0147371 A1 | 8/2003 | Choi et al. |
| 2003/0157900 A1 | 8/2003 | Gaal et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0228850 A1 | 12/2003 | Hwang |
| 2003/0235255 A1 | 12/2003 | Ketchum et al. |
| 2004/0002364 A1 | 1/2004 | Trikkonen et al. |
| 2004/0015692 A1 | 1/2004 | Green et al. |
| 2004/0017785 A1 | 1/2004 | Zelst |
| 2004/0048609 A1 | 3/2004 | Kosaka |
| 2004/0058687 A1 | 3/2004 | Kim et al. |
| 2004/0066761 A1 | 4/2004 | Giannakis et al. |
| 2004/0072565 A1 | 4/2004 | Nobukiyo et al. |
| 2004/0077379 A1 | 4/2004 | Smith et al. |
| 2004/0087325 A1 | 5/2004 | Cheng et al. |
| 2004/0097215 A1 | 5/2004 | Abe et al. |
| 2004/0098505 A1 | 5/2004 | Clemmensen |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0136344 A1 | 7/2004 | Kim et al. |
| 2004/0136349 A1 | 7/2004 | Walton et al. |
| 2004/0141548 A1 | 7/2004 | Shattil |
| 2004/0156328 A1 | 8/2004 | Walton et al. |
| 2004/0160914 A1 | 8/2004 | Sarkar |
| 2004/0160933 A1 | 8/2004 | Odenwalder et al. |
| 2004/0166867 A1 | 8/2004 | Hawe |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0179627 A1 | 9/2004 | Ketchum et al. |
| 2004/0185792 A1 | 9/2004 | Alexiou et al. |
| 2004/0202257 A1 | 10/2004 | Mehta et al. |
| 2004/0208138 A1 | 10/2004 | Hayashi et al. |
| 2004/0219819 A1 | 11/2004 | Di Mascio |
| 2004/0219919 A1 | 11/2004 | Whinnett et al. |
| 2004/0224711 A1 | 11/2004 | Panchal et al. |
| 2004/0228313 A1 | 11/2004 | Cheng et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2005/0002412 A1 | 1/2005 | Sagfors et al. |
| 2005/0002440 A1 | 1/2005 | Alamouti et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0030886 A1 | 2/2005 | Wu et al. |
| 2005/0034079 A1 | 2/2005 | Gunasekar et al. |
| 2005/0041611 A1 | 2/2005 | Sandhu |
| 2005/0041618 A1 | 2/2005 | Wei et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0073976 A1 | 4/2005 | Fujii |
| 2005/0084000 A1 | 4/2005 | Krauss et al. |
| 2005/0085236 A1 | 4/2005 | Gerlach et al. |
| 2005/0111397 A1 | 5/2005 | Attar et al. |
| 2005/0122898 A1 | 6/2005 | Jang et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |

| | | | | | | |
|---|---|---|---|---|---|---|
| 2005/0174981 A1 | 8/2005 | Heath et al. | | 2006/0274836 A1 | 12/2006 | Sampath et al. |
| 2005/0175070 A1 | 8/2005 | Grob et al. | | 2006/0285485 A1 | 12/2006 | Agrawal et al. |
| 2005/0180311 A1 | 8/2005 | Wang et al. | | 2006/0285515 A1 | 12/2006 | Julian et al. |
| 2005/0180313 A1 | 8/2005 | Kim et al. | | 2006/0286974 A1 | 12/2006 | Gore et al. |
| 2005/0192011 A1 | 9/2005 | Hong et al. | | 2006/0286982 A1 | 12/2006 | Prakash et al. |
| 2005/0195733 A1 | 9/2005 | Walton et al. | | 2006/0286995 A1 | 12/2006 | Onggosanusi et al. |
| 2005/0195852 A1 | 9/2005 | Vayanos et al. | | 2006/0291371 A1 | 12/2006 | Sutivong et al. |
| 2005/0195886 A1 | 9/2005 | Lampinen et al. | | 2006/0292989 A1 | 12/2006 | Gerlach et al. |
| 2005/0201296 A1 | 9/2005 | Vannithamby et al. | | 2007/0004430 A1 | 1/2007 | Hyun et al. |
| 2005/0207367 A1 | 9/2005 | Onggosanusi et al. | | 2007/0005749 A1 | 1/2007 | Sampath |
| 2005/0239465 A1 | 10/2005 | Lee et al. | | 2007/0009011 A1 | 1/2007 | Coulson |
| 2005/0243791 A1 | 11/2005 | Park et al. | | 2007/0019596 A1 | 1/2007 | Barriac et al. |
| 2005/0246548 A1 | 11/2005 | Laitinen | | 2007/0025345 A1 | 2/2007 | Bachl et al. |
| 2005/0249266 A1 | 11/2005 | Brown et al. | | 2007/0041404 A1 | 2/2007 | Palanki et al. |
| 2005/0254416 A1 | 11/2005 | Laroia et al. | | 2007/0041457 A1 | 2/2007 | Kadous et al. |
| 2005/0254467 A1 | 11/2005 | Li et al. | | 2007/0047485 A1 | 3/2007 | Gorokhov et al. |
| 2005/0254477 A1 | 11/2005 | Lee et al. | | 2007/0047495 A1 | 3/2007 | Ji et al. |
| 2005/0254556 A1 | 11/2005 | Fujii et al. | | 2007/0049218 A1 | 3/2007 | Gorokhov et al. |
| 2005/0259005 A1 | 11/2005 | Chiang et al. | | 2007/0053282 A1 | 3/2007 | Tong et al. |
| 2005/0259723 A1 | 11/2005 | Blanchard | | 2007/0053383 A1 | 3/2007 | Choi et al. |
| 2005/0259757 A1 | 11/2005 | Wu et al. | | 2007/0060178 A1 | 3/2007 | Gorokhov et al. |
| 2005/0265293 A1 | 12/2005 | Ro et al. | | 2007/0064669 A1 | 3/2007 | Classon et al. |
| 2005/0276347 A1 | 12/2005 | Mujtaba et al. | | 2007/0071147 A1 | 3/2007 | Sampath et al. |
| 2005/0276348 A1 | 12/2005 | Vandenameele | | 2007/0097853 A1 | 5/2007 | Khandekar et al. |
| 2005/0277423 A1 | 12/2005 | Sandhu et al. | | 2007/0097889 A1 | 5/2007 | Wang et al. |
| 2005/0281290 A1 | 12/2005 | Khandekar et al. | | 2007/0097897 A1 | 5/2007 | Teague et al. |
| 2005/0282500 A1 | 12/2005 | Wang et al. | | 2007/0097908 A1 | 5/2007 | Khandekar et al. |
| 2005/0286408 A1 | 12/2005 | Jin et al. | | 2007/0097909 A1 | 5/2007 | Khandekar et al. |
| 2005/0289256 A1 | 12/2005 | Cudak et al. | | 2007/0097910 A1 | 5/2007 | Ji et al. |
| 2006/0002451 A1 | 1/2006 | Fukuta et al. | | 2007/0097922 A1 | 5/2007 | Parekh et al. |
| 2006/0013285 A1 | 1/2006 | Kobayashi et al. | | 2007/0097927 A1 | 5/2007 | Gorokhov et al. |
| 2006/0018336 A1 | 1/2006 | Sutivong et al. | | 2007/0097942 A1 | 5/2007 | Gorokhov et al. |
| 2006/0018347 A1 | 1/2006 | Agrawal | | 2007/0097981 A1 | 5/2007 | Papasakellariou |
| 2006/0018397 A1 | 1/2006 | Sampath et al. | | 2007/0098050 A1 | 5/2007 | Khandekar et al. |
| 2006/0026344 A1 | 2/2006 | Sun Hsu et al. | | 2007/0098120 A1 | 5/2007 | Wang |
| 2006/0029289 A1 | 2/2006 | Yamaguchi et al. | | 2007/0110172 A1 | 5/2007 | Faulkner et al. |
| 2006/0034173 A1 | 2/2006 | Teague et al. | | 2007/0115795 A1 | 5/2007 | Gore et al. |
| 2006/0039332 A1 | 2/2006 | Kotzin | | 2007/0149194 A1 | 6/2007 | Das et al. |
| 2006/0039344 A1 | 2/2006 | Khan | | 2007/0149228 A1 | 6/2007 | Das |
| 2006/0040655 A1 | 2/2006 | Kim | | 2007/0159969 A1 | 7/2007 | Das et al. |
| 2006/0050770 A1 | 3/2006 | Wallace et al. | | 2007/0160115 A1 | 7/2007 | Palanki et al. |
| 2006/0056340 A1 | 3/2006 | Hottinen et al. | | 2007/0165738 A1 | 7/2007 | Barriac et al. |
| 2006/0057958 A1 | 3/2006 | Ngo et al. | | 2007/0177631 A1 | 8/2007 | Popovic et al. |
| 2006/0067421 A1 | 3/2006 | Walton et al. | | 2007/0177681 A1 | 8/2007 | Choi et al. |
| 2006/0078075 A1 | 4/2006 | Stamoulis et al. | | 2007/0183303 A1 | 8/2007 | Pi et al. |
| 2006/0083159 A1 | 4/2006 | Laroia et al. | | 2007/0183386 A1 | 8/2007 | Muharemovic et al. |
| 2006/0083183 A1 | 4/2006 | Teague et al. | | 2007/0207812 A1 | 9/2007 | Borran et al. |
| 2006/0092054 A1 | 5/2006 | Li et al. | | 2007/0211616 A1 | 9/2007 | Khandekar et al. |
| 2006/0104333 A1 | 5/2006 | Rainbolt et al. | | 2007/0211667 A1 | 9/2007 | Agrawal et al. |
| 2006/0104381 A1 | 5/2006 | Menon et al. | | 2007/0230324 A1 | 10/2007 | Li et al. |
| 2006/0111054 A1 | 5/2006 | Pan et al. | | 2007/0242653 A1 | 10/2007 | Yang et al. |
| 2006/0114858 A1 | 6/2006 | Walton et al. | | 2007/0263743 A1 | 11/2007 | Lee et al. |
| 2006/0120469 A1 | 6/2006 | Maltsev et al. | | 2007/0280336 A1 | 12/2007 | Zhang et al. |
| 2006/0120471 A1 | 6/2006 | Learned et al. | | 2007/0281702 A1 | 12/2007 | Lim et al. |
| 2006/0126491 A1 | 6/2006 | Ro et al. | | 2008/0039129 A1 | 2/2008 | Li et al. |
| 2006/0133269 A1 | 6/2006 | Prakash et al. | | 2008/0063099 A1 | 3/2008 | Laroia et al. |
| 2006/0133455 A1 | 6/2006 | Agrawal et al. | | 2008/0095223 A1 | 4/2008 | Tong et al. |
| 2006/0133521 A1 | 6/2006 | Sampath et al. | | 2008/0095262 A1 | 4/2008 | Ho et al. |
| 2006/0140289 A1 | 6/2006 | Mandyam et al. | | 2008/0151829 A1 | 6/2008 | Khandekar et al. |
| 2006/0153239 A1 | 7/2006 | Julian et al. | | 2008/0181139 A1 | 7/2008 | Rangarajan et al. |
| 2006/0155534 A1 | 7/2006 | Lin et al. | | 2008/0214222 A1 | 9/2008 | Atarashi et al. |
| 2006/0156199 A1 | 7/2006 | Palanki et al. | | 2008/0253279 A1 | 10/2008 | Ma et al. |
| 2006/0172704 A1 | 8/2006 | Nishio et al. | | 2008/0267157 A1 | 10/2008 | Lee et al. |
| 2006/0189321 A1 | 8/2006 | Oh et al. | | 2008/0299983 A1 | 12/2008 | Kwak et al. |
| 2006/0203708 A1 | 9/2006 | Sampath et al. | | 2009/0003466 A1 | 1/2009 | Taherzadehboroujeni et al. |
| 2006/0203794 A1 | 9/2006 | Sampath et al. | | 2009/0010351 A1 | 1/2009 | Laroia et al. |
| 2006/0203891 A1 | 9/2006 | Sampath et al. | | 2009/0022098 A1 | 1/2009 | Novak et al. |
| 2006/0203932 A1 | 9/2006 | Palanki et al. | | 2009/0041150 A1 | 2/2009 | Tsai et al. |
| 2006/0209670 A1 | 9/2006 | Gorokhov et al. | | 2009/0110103 A1 | 4/2009 | Maltsev et al. |
| 2006/0209732 A1 | 9/2006 | Gorokhov et al. | | 2009/0180459 A1 | 7/2009 | Orlik et al. |
| 2006/0209754 A1 | 9/2006 | Ji et al. | | 2009/0197646 A1 | 8/2009 | Tamura et al. |
| 2006/0209764 A1 | 9/2006 | Kim et al. | | 2009/0201826 A1 | 8/2009 | Gorokhov et al. |
| 2006/0209973 A1 | 9/2006 | Gorokhov et al. | | 2009/0201872 A1 | 8/2009 | Gorokhov et al. |
| 2006/0215777 A1 | 9/2006 | Krishnamoorthi | | 2009/0213750 A1 | 8/2009 | Gorokhov et al. |
| 2006/0218459 A1 | 9/2006 | Hedberg | | 2009/0213950 A1 | 8/2009 | Gorokhov et al. |
| 2006/0223449 A1 | 10/2006 | Sampath et al. | | 2009/0262641 A1 | 10/2009 | Laroia et al. |
| 2006/0233124 A1 | 10/2006 | Palanki | | 2009/0262699 A1 | 10/2009 | Wengerter et al. |
| 2006/0233131 A1 | 10/2006 | Gore et al. | | 2009/0285163 A1 | 11/2009 | Zhang et al. |
| 2006/0270427 A1 | 11/2006 | Shida et al. | | 2009/0287977 A1 | 11/2009 | Chang et al. |

| | | | | | | |
|---|---|---|---|---|---|---|
| 2010/0002570 A9 | 1/2010 | Walton et al. | | EP | 1445873 A2 | 8/2004 |
| 2010/0135242 A1 | 6/2010 | Nam et al. | | EP | 1465449 A1 | 10/2004 |
| 2010/0220800 A1 | 9/2010 | Erell et al. | | EP | 1478204 A2 | 11/2004 |
| 2010/0232384 A1 | 9/2010 | Farajidana et al. | | EP | 1507421 A1 | 2/2005 |
| 2010/0254263 A1 | 10/2010 | Chen et al. | | EP | 1513356 A2 | 3/2005 |
| 2011/0064070 A1 | 3/2011 | Gore et al. | | EP | 1531575 A2 | 5/2005 |
| 2011/0235733 A1 | 9/2011 | Laroia et al. | | EP | 1533950 A1 | 5/2005 |
| 2011/0235745 A1 | 9/2011 | Laroia et al. | | EP | 1538863 A1 | 6/2005 |
| 2011/0235746 A1 | 9/2011 | Laroia et al. | | EP | 1542488 A1 | 6/2005 |
| 2011/0235747 A1 | 9/2011 | Laroia et al. | | EP | 1601149 A2 | 11/2005 |
| 2011/0255518 A9 | 10/2011 | Agrawal et al. | | EP | 1643669 A1 | 4/2006 |
| 2011/0306291 A1 | 12/2011 | Ma et al. | | EP | 1898542 A1 | 3/2008 |
| 2012/0002623 A1 | 1/2012 | Khandekar et al. | | EP | 1941693 | 7/2011 |
| 2012/0063441 A1 | 3/2012 | Palanki | | FR | 2584884 | 1/1987 |
| 2012/0120925 A1 | 5/2012 | Kadous et al. | | GB | 2279540 | 1/1995 |
| 2012/0140798 A1 | 6/2012 | Kadous et al. | | GB | 2348776 A | 7/2003 |
| 2012/0140838 A1 | 6/2012 | Kadous et al. | | GB | 2412541 | 9/2005 |
| 2013/0016678 A1 | 1/2013 | Laroia et al. | | IL | 167573 | 2/2011 |
| | | | | IL | 201872 | 5/2012 |
| | FOREIGN PATENT DOCUMENTS | | | JP | 04301931 A | 10/1992 |
| CA | 2540688 | 5/2005 | | JP | 7336323 | 12/1995 |
| CA | 2577369 | 3/2006 | | JP | 8116329 A | 5/1996 |
| CL | 19931400 | 12/1994 | | JP | 08288927 | 11/1996 |
| CL | 8461997 | 1/1998 | | JP | 9008725 A | 1/1997 |
| CL | 27102004 | 8/2005 | | JP | H09501548 A | 2/1997 |
| CL | 22892004 | 9/2005 | | JP | 9131342 | 5/1997 |
| CL | 30862004 | 10/2005 | | JP | 9182148 A | 7/1997 |
| CL | 29932005 | 5/2006 | | JP | 09214404 | 8/1997 |
| CL | 15212006 | 3/2007 | | JP | 10117162 | 5/1998 |
| CL | 14922006 | 4/2007 | | JP | 10322304 | 12/1998 |
| CL | 14892006 | 5/2007 | | JP | 11191756 A | 7/1999 |
| CL | 14902006 | 5/2007 | | JP | 11196109 | 7/1999 |
| CL | 46151 | 12/2009 | | JP | 11508417 T | 7/1999 |
| CN | 1252919 | 5/2000 | | JP | 11239155 A | 8/1999 |
| CN | 1267437 | 9/2000 | | JP | 11298954 | 10/1999 |
| CN | 1284795 | 2/2001 | | JP | 11331927 A | 11/1999 |
| CN | 1296682 | 5/2001 | | JP | 2000102065 A | 4/2000 |
| CN | 1344451 | 4/2002 | | JP | 2000184425 | 6/2000 |
| CN | 1346221 | 4/2002 | | JP | 2000511750 A | 9/2000 |
| CN | 1383631 | 12/2002 | | JP | 2000332724 | 11/2000 |
| CN | 1386344 | 12/2002 | | JP | 2001016644 A2 | 1/2001 |
| CN | 1402916 A | 3/2003 | | JP | 2001045573 A | 2/2001 |
| CN | 1424835 | 6/2003 | | JP | 2001057545 A | 2/2001 |
| CN | 1132474 C | 12/2003 | | JP | 2001156732 A | 6/2001 |
| CN | 1467938 A | 1/2004 | | JP | 2001238269 | 8/2001 |
| CN | 1487755 A | 4/2004 | | JP | 2001245355 A | 9/2001 |
| CN | 1520220 | 8/2004 | | JP | 2001249802 A | 9/2001 |
| CN | 1525678 | 9/2004 | | JP | 2001521698 A | 11/2001 |
| CN | 1642051 A | 7/2005 | | JP | 2001526012 | 12/2001 |
| CN | 1647436 | 7/2005 | | JP | 2002026790 | 1/2002 |
| DE | 19800653 A1 | 7/1999 | | JP | 2002515203 T | 5/2002 |
| DE | 19800953 C1 | 7/1999 | | JP | 2002534925 A | 10/2002 |
| DE | 19957288 C1 | 5/2001 | | JP | 2002534941 | 10/2002 |
| DE | 10240138 | 8/2003 | | JP | 2003032218 | 1/2003 |
| DE | 10254384 | 6/2004 | | JP | 2003500909 | 1/2003 |
| EP | 0488976 | 6/1992 | | JP | 200369472 | 3/2003 |
| EP | 0568291 A2 | 11/1993 | | JP | 2003101515 | 4/2003 |
| EP | 0786889 A1 | 7/1997 | | JP | 2003169367 A | 6/2003 |
| EP | 0805576 A2 | 11/1997 | | JP | 2003174426 | 6/2003 |
| EP | 0807989 A1 | 11/1997 | | JP | 2003199173 A | 7/2003 |
| EP | 0844796 A2 | 5/1998 | | JP | 2003520523 | 7/2003 |
| EP | 0981222 A2 | 2/2000 | | JP | 2003249907 A | 9/2003 |
| EP | 1001570 A2 | 5/2000 | | JP | 2003292667 A | 10/2003 |
| EP | 1047209 A1 | 10/2000 | | JP | 2003347985 A | 12/2003 |
| EP | 1061687 A1 | 12/2000 | | JP | 2003348047 | 12/2003 |
| EP | 1091516 A1 | 4/2001 | | JP | 2004007643 A | 1/2004 |
| EP | 1093241 A1 | 4/2001 | | JP | 2004023716 | 1/2004 |
| EP | 1148673 A2 | 10/2001 | | JP | 2004048716 | 2/2004 |
| EP | 1180907 A2 | 2/2002 | | JP | 200472457 | 3/2004 |
| EP | 1187506 A1 | 3/2002 | | JP | 2004072157 A | 3/2004 |
| EP | 1204217 A1 | 5/2002 | | JP | 2004096142 | 3/2004 |
| EP | 1255369 | 11/2002 | | JP | 2004507950 A | 3/2004 |
| EP | 1267513 | 12/2002 | | JP | 2004153676 | 5/2004 |
| EP | 1286490 A2 | 2/2003 | | JP | 2004158901 A | 6/2004 |
| EP | 1335504 A2 | 8/2003 | | JP | 2004162388 A | 6/2004 |
| EP | 1376920 A1 | 1/2004 | | JP | 2004194262 A | 7/2004 |
| EP | 1392073 A1 | 2/2004 | | JP | 2004221972 | 8/2004 |
| EP | 1434365 A2 | 6/2004 | | JP | 2004266818 | 9/2004 |
| EP | 1441469 A2 | 7/2004 | | JP | 2004529524 T | 9/2004 |

| | | | | | | |
|---|---|---|---|---|---|---|
| JP | 2004297276 A | 10/2004 | | WO | WO9800946 | 1/1998 |
| JP | 2004297756 | 10/2004 | | WO | WO9814026 A1 | 4/1998 |
| JP | 2004534456 | 11/2004 | | WO | WO9837706 A2 | 8/1998 |
| JP | 2004535106 A | 11/2004 | | WO | WO9848581 A1 | 10/1998 |
| JP | 2005006337 | 1/2005 | | WO | WO9853561 | 11/1998 |
| JP | 2005020530 | 1/2005 | | WO | WO9854919 A2 | 12/1998 |
| JP | 2005502218 T | 1/2005 | | WO | WO9941871 A1 | 8/1999 |
| JP | 2005506757 | 3/2005 | | WO | WO9944313 | 9/1999 |
| JP | 2005130491 A | 5/2005 | | WO | WO9944383 A1 | 9/1999 |
| JP | 2005197772 | 7/2005 | | WO | WO9952250 A1 | 10/1999 |
| JP | 2005203961 | 7/2005 | | WO | WO9953713 A2 | 10/1999 |
| JP | 2005521327 | 7/2005 | | WO | WO9959265 | 11/1999 |
| JP | 2005521358 | 7/2005 | | WO | WO9960729 A1 | 11/1999 |
| JP | 2006505172 | 2/2006 | | WO | WO0002397 | 1/2000 |
| JP | 2006506860 A | 2/2006 | | WO | WO0033503 | 6/2000 |
| JP | 2006211537 A | 8/2006 | | WO | WO0070897 | 11/2000 |
| JP | 2007503790 | 2/2007 | | WO | WO0101596 | 1/2001 |
| JP | 2007519281 | 7/2007 | | WO | WO0117125 A1 | 3/2001 |
| JP | 2007520309 A | 7/2007 | | WO | WO0126269 | 4/2001 |
| JP | 2007525043 T | 8/2007 | | WO | WO0139523 A2 | 5/2001 |
| JP | 2007527127 | 9/2007 | | WO | WO0145300 | 6/2001 |
| JP | 2008505587 A | 2/2008 | | WO | WO0148969 A2 | 7/2001 |
| JP | 2008535398 | 8/2008 | | WO | WO0158054 A1 | 8/2001 |
| JP | 4188372 B2 | 11/2008 | | WO | WO0160106 | 8/2001 |
| JP | 2008546314 | 12/2008 | | WO | WO0169814 A1 | 9/2001 |
| JP | 04694628 B2 | 6/2011 | | WO | WO0182543 | 11/2001 |
| KR | 0150275 B1 | 11/1998 | | WO | WO0182544 A2 | 11/2001 |
| KR | 20000060428 | 10/2000 | | WO | WO0189112 A1 | 11/2001 |
| KR | 100291476 B1 | 3/2001 | | WO | WO0193505 | 12/2001 |
| KR | 20010056333 | 4/2001 | | WO | WO0204936 A1 | 1/2002 |
| KR | 20010087715 A | 9/2001 | | WO | WO0207375 A1 | 1/2002 |
| KR | 20030007965 | 1/2003 | | WO | WO0215616 A2 | 2/2002 |
| KR | 20030035969 A | 5/2003 | | WO | WO0219746 A1 | 3/2002 |
| KR | 20040063057 | 7/2004 | | WO | WO0231991 A2 | 4/2002 |
| KR | 200471652 | 8/2004 | | WO | WO0233848 A2 | 4/2002 |
| KR | 20040103441 A | 12/2004 | | WO | WO0245456 A1 | 6/2002 |
| KR | 20050063826 A | 6/2005 | | WO | WO0249306 | 6/2002 |
| KR | 100606099 | 7/2006 | | WO | WO0249385 A2 | 6/2002 |
| RU | 95121152 | 12/1997 | | WO | WO02049305 | 6/2002 |
| RU | 2141168 C1 | 11/1999 | | WO | WO02060138 | 8/2002 |
| RU | 2141706 C1 | 11/1999 | | WO | WO02065675 | 8/2002 |
| RU | 2159007 C2 | 11/2000 | | WO | WO02082689 A2 | 10/2002 |
| RU | 2162275 C2 | 1/2001 | | WO | WO02082743 A2 | 10/2002 |
| RU | 2192094 | 10/2002 | | WO | WO02089434 A1 | 11/2002 |
| RU | 2197778 C2 | 1/2003 | | WO | WO02093782 A1 | 11/2002 |
| RU | 2207723 C1 | 6/2003 | | WO | WO02093819 A1 | 11/2002 |
| RU | 2208913 | 7/2003 | | WO | WO02100027 A1 | 12/2002 |
| RU | 2210866 | 8/2003 | | WO | WO03001696 A2 | 1/2003 |
| RU | 2216101 C2 | 11/2003 | | WO | WO03001761 A1 | 1/2003 |
| RU | 2216105 C2 | 11/2003 | | WO | WO03001981 A2 | 1/2003 |
| RU | 2225080 | 2/2004 | | WO | WO03003617 | 1/2003 |
| RU | 2235429 C1 | 8/2004 | | WO | WO03019819 | 3/2003 |
| RU | 2235432 C2 | 8/2004 | | WO | WO03030414 | 4/2003 |
| RU | 2237379 C2 | 9/2004 | | WO | WO03034644 A1 | 4/2003 |
| RU | 2238611 | 10/2004 | | WO | WO03043262 | 5/2003 |
| RU | 2242091 C2 | 12/2004 | | WO | WO03043369 | 5/2003 |
| RU | 2250564 | 4/2005 | | WO | WO03058871 A1 | 7/2003 |
| RU | 2257008 | 7/2005 | | WO | WO03067783 | 8/2003 |
| RU | 2267224 | 12/2005 | | WO | WO03069832 A1 | 8/2003 |
| RU | 2005129079 A | 2/2006 | | WO | WO03073646 | 9/2003 |
| RU | 2285338 C2 | 10/2006 | | WO | WO03075479 | 9/2003 |
| RU | 2285351 C2 | 10/2006 | | WO | WO03085876 | 10/2003 |
| RU | 2292655 | 1/2007 | | WO | WO03088538 A1 | 10/2003 |
| RU | 2335864 C2 | 10/2008 | | WO | WO03094384 | 11/2003 |
| RU | 2349043 C2 | 3/2009 | | WO | WO03103331 | 12/2003 |
| SU | 1320883 | 6/1987 | | WO | WO2004002047 | 12/2003 |
| TW | 508960 | 11/2002 | | WO | WO2004004370 | 1/2004 |
| TW | 510132 | 11/2002 | | WO | WO2004008671 | 1/2004 |
| TW | 200302642 | 8/2003 | | WO | WO2004008681 A1 | 1/2004 |
| TW | 200401572 | 1/2004 | | WO | WO2004015912 | 2/2004 |
| TW | I232040 | 5/2005 | | WO | WO2004016007 | 2/2004 |
| TW | 248266 | 1/2006 | | WO | WO2004021605 A1 | 3/2004 |
| TW | 200718128 | 5/2007 | | WO | WO2004023834 A1 | 3/2004 |
| WO | WO9408432 | 4/1994 | | WO | WO2004030238 A1 | 4/2004 |
| WO | WO9521494 | 8/1995 | | WO | WO2004032443 A1 | 4/2004 |
| WO | WO9613920 A1 | 5/1996 | | WO | 2004040825 | 5/2004 |
| WO | WO9701256 | 1/1997 | | WO | WO2004038954 | 5/2004 |
| WO | WO9737456 A2 | 10/1997 | | WO | WO2004038972 | 5/2004 |
| WO | WO9746033 A2 | 12/1997 | | WO | WO2004038988 | 5/2004 |

| | | |
|---|---|---|
| WO | WO2004040690 A2 | 5/2004 |
| WO | WO2004040827 | 5/2004 |
| WO | WO2004047354 | 6/2004 |
| WO | WO2004049618 A1 | 6/2004 |
| WO | WO2004051872 A2 | 6/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004073276 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO2004086706 A1 | 10/2004 |
| WO | WO2004086711 | 10/2004 |
| WO | WO2004095730 A1 | 11/2004 |
| WO | WO2004095851 | 11/2004 |
| WO | WO2004095854 | 11/2004 |
| WO | WO2004098072 | 11/2004 |
| WO | WO2004098222 | 11/2004 |
| WO | WO2004102815 | 11/2004 |
| WO | WO2004102816 A2 | 11/2004 |
| WO | WO2004105272 A1 | 12/2004 |
| WO | WO2004114549 | 12/2004 |
| WO | WO2005002253 A1 | 1/2005 |
| WO | 2005011163 A1 | 2/2005 |
| WO | 2005018270 | 2/2005 |
| WO | WO2005015795 A1 | 2/2005 |
| WO | WO2005015797 | 2/2005 |
| WO | WO2005015810 | 2/2005 |
| WO | WO2005015941 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | WO2005032004 A1 | 4/2005 |
| WO | WO2005043855 | 5/2005 |
| WO | WO2005046080 | 5/2005 |
| WO | WO2005055484 A1 | 6/2005 |
| WO | WO2005055527 | 6/2005 |
| WO | WO2005060192 A1 | 6/2005 |
| WO | WO2005065062 A2 | 7/2005 |
| WO | WO2005069538 A1 | 7/2005 |
| WO | WO2005074184 | 8/2005 |
| WO | WO2005096538 | 10/2005 |
| WO | WO2005122628 | 12/2005 |
| WO | 2006007292 A2 | 1/2006 |
| WO | WO2006019710 | 2/2006 |
| WO | WO2006026344 | 3/2006 |
| WO | WO2006044487 | 4/2006 |
| WO | 2006069301 | 6/2006 |
| WO | WO2006069300 | 6/2006 |
| WO | WO2006069397 | 6/2006 |
| WO | WO2006077696 | 7/2006 |
| WO | WO2006096784 A1 | 9/2006 |
| WO | WO2006099545 A1 | 9/2006 |
| WO | WO2006127544 A2 | 11/2006 |
| WO | WO2006134032 | 12/2006 |
| WO | WO2006138196 | 12/2006 |
| WO | WO2006138573 | 12/2006 |
| WO | WO2006138581 A2 | 12/2006 |
| WO | WO2007024934 | 3/2007 |
| WO | WO2007024935 | 3/2007 |
| WO | WO2007025160 | 3/2007 |
| WO | WO2007051159 | 5/2007 |

OTHER PUBLICATIONS

Catreux, S. et al.: "Simulation results for an interference-limited multiple input multiple output cellular system," Global Telecommunications Conference, 2000. Globecom '00. IEEE. Dec. 1, 2000. vol. 2, pp. 1094-1096, http://ieeexplore.ieee.org/ie15/7153/19260/00891306.pdf?tp=&isnumber=19260&arnumber=8913063&punumber=7153.

Chung, S. et al.: "Low complexity algorithm for rate and power quantization in extended V-Blast" VTC Fall 2001. IEEE 54th. Vehicular Technology Conference Proceedings. Atlantic City, NJ, Oct. 7-11, 2001, vol. 1 of 4, pp. 910-914, Conf. 54.

El Gamal, H. et al.: "Universal Space-Time Coding," IEEE Transactions on Information Theory, vol. 49, Issue 5, pp. 1097-1119, XP011074756, ISSN: 0018-9448, May 2003.

European Search Report—EP10008766, Search Authority—Berlin Patent Office, Oct. 28, 2010.

Hochwald, B. et al., "Achieving near-capacity on a multiple-antenna channel," IEEE Transactions on Communications, IEEE Service Center, Piscataway, New Jersey, vol. 51, No. 3, pp. 389-398 (2003).

Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.

Kousa, M. et al: "Adaptive Binary Coding for Diversity Communication Systems" IEEE International Conference on Personal Wireless Communications Proceedings, pp. 80-84, XP000992269, (1997).

Maniatis, I. et al., "Pilots for joint channel estimation in multi-user OFDM mobile radio systems," Spread Spectrum Techniques and Applications, 2002 IEEE Seventh International Symposium, Sep. 2, 2002, pp. 44-48, XP010615562.

Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.

Qualcomm Europe: "Description and link simulations for OFDMA based E-UTRA uplink" 3GPP Draft; R1-051100, 3rd Generation Partnership Project (3GPP), Mobile Competence Centre; Sophia-Antipolis Cedex, France, vol. RAN WG1, no. San Diego, USA; 20051004, Oct. 4, 2005, pp. 1-10, XP050100715.

Widdup, B. et al., "A highly-parallel VLSI architecture for a list sphere detector," IEEE International Conference, Paris, France, vol. 5, pp. 2720-2725 (2004).

Wiesel, A. et al.: "Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, pp. 36-40, XP010713463.

Tomcik, Jim: "QFDD Technology Overview Presentation," IEEE 802.20 Working Group on Mobile Broadband Wireless Access, [Online] Nov. 15, 2005, pp. 1-73, XP002467626.

3GPP TS 33.220 V.1.1.0 XX,XX, "3rd Generation Partnership Projects; Technical Specification Group Services and System Aspects; Generic Authentication Architecture (GAA); Generic Bootstrapping Architecture (Release 6)" Feb. 9, 2004, pp. 1-17, figure 4, XP002996023.

3rd Generation Partnership Project; Technical Specification Group Radio Access Network; Physical Layer Aspects for Evolved UTRA (Release 7), 3GPP TR 25.814 v0.3.1 (Nov. 2005).

Bahai, Saltzberg: "System Architecture," Multi-Carrier Digital Communications, Kluwer Academic, New York, NY, XP-002199501, 1999, pp. 17-21.

Bingham: "Other Types of MCM," ADSL, VDSL, and Multicarrier Modulation, John wiley & Sons, New York, XP-002199502. 2000, pp. 111-113.

Chennakeshu, et al. "Capacity Analysis of a TDMA-Based Slow-Frequency—Hopped Cellular System," IEEE Transaction on Vehicular Technology, vol. 45., No. 3 Aug. 1996, pp. 531-542.

Dinis R; Ralconer D; Tonglam C; Sabbaghian M: "A Multiple Access Scheme for the Uplink of Broadband Wireless Systems" Global Telecommunications Conference, 2004. Globecom 04. IEEE Dallas, TX, USA Nov. 29-Dec. 3, 2004, vol. 6, pp. 3808-3812, XP010758449 Piscataway, NJ, USA, IEEE.

Hermann Rohling et al., : "Performance Comparison of Different Multiple Access Schemes for the Downlink of an OFDM Communication System", Vehicular Technology Conference, 1997, 47th IEEE, vol. 3, May 4-7, 1997, pp. 1365-1369.

Hill, et al., "Cyclic Shifting and Time Inversion of Partial Transmit Sequences to Reduce the Peak-to-Average Power Ratio in OFDM,"

IEEE International Symposium on Personal, Indoor and Mobile Radio Communications, vol. 2, Sep. 18, 2000, Piscataway, NJ, pp. 1256-1259.

Hui Won Je et al, "A Novel Multiple Access Scheme for Uplink Cellular Systems 1," Vehicular Technology Conference, 2004, VTC2004-fall, 2004 IEEE 60th Los Angeles, CA, US, Sep. 26-29, 2004, Piscataway, NY, pp. 984-988.

International Search Report and Written Opinion—PCT/US06/ 009757, International Search Authority—European Patent Office, Jul. 26, 2006.

John B. Groe, Lawrence E. Larson, "CDMA Mobile Radio Design" Sep. 26, 2001, Artech House, Norwood, MA02062 580530, XP002397967, pp. 157-159.

J.S. Chow and J.M. Cioffi: "A cost-effective maximum likelihood reciever for multicarrier systems", Proc. IEEE Int. Conf. on Comm., pp. 948-952, Jun. 1992.

Kaleh: "Channel Equalization for Block Transmission Systems," IEEE Journal on Selected Areas in Communications, vol. 13, No. 1, Jan. 1995, pp. 110-121.

Kappes, J.M., and Sayegh, S.I., "Programmable Demultiplexer/Demodulator Processor," COMSAT Laboratories, IEEE, 1990, pp. 230-234.

Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.

Keller, et al.: "Adaptive Multicarrier Modulation: A Convenient Framework for Time-Frequency Processing in Wireless Communications," Proceedings of the IEEE, vol. 88, No. 5, May 2000, pp. 611-640.

Kim, et al. "Performance of TDMA System With SFH and 2-Bit Differentially Detected GMSK Over Rayleigh Fading Channel," IEEE Vehicular Technology Conference, Apr. 28, 1996, pp. 789-793.

Kishiyama et al., Investigation of optimum pilot channle structure for VSF-OFCDM broadband wireless access in forward link, VTC 2003-Spring, The 57th IEEE Semiannual Vehicular Technology Conference, Proceedings JEJU, korea, Apr. 22-25, 2003, pp. 139-144.

Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.

Kostic, et al. "Fundamentals of Dynamic Frequency Hopping in Cellular Systems," IEEE Journal on Selected Areas in Communications, vol. 19, No. 11, Nov. 2001, pp. 2254-2266.

Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.

Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.

Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.

Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.

Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.

Lott: "Comparison of Frequency and Time Domain Differential Modulation in an OFDM System for Wireless ATM," 1999 IEEE 49th Vehicular Technology Conference, vol. 2, Jul. 1999, pp. 877-883.

Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.

Molisch, et al., MIMO systems with antenna selection, IEEE Microwave Magazine, URL: http://ieeexplore.ieee.org/iel5/6668/28677/ 01284943.pdf, Retrieved on Dec. 8, 2006, pp. 36-56 (2004).

Naofal Al-Dhahir: "A Bandwidth-Optimized Reduced-Complexity Equalized Multicarrier Transceiver", IEEE Transactions on Communications, vol. 45, No. 8, Aug. 1997.

Naofal Al-Dhahir: "Optimum Finite-Length Equalization for Multicarrier Transceivers", IEEE Trans. on Comm., pp. 56-64, Jan. 1996.

Nassar et al., "Introduction of Carrier Interference to Spread Spectrum Multiple Access," Wireless Communications and Systems, 1999 Emerging Technologies Symposium, IEEE, Apr. 12-13, 1999, pp. 1-5.

Natarajan, et al., "High-Performance MC-CDMA via Carrier Interferometry Codes," IEEE Transactions on Vehicular Technology, 2001, 50 (6).

NTT DoCoMo, et al.: "Orthogonal Common Pilot Channel and Scrambling Code in Evolved UTRA Downlink," 3GPP TSG RAN WG1 #42 on LTE, pp. 1-8 (Aug.-Sep. 2005).

S. Nishimura et al., "Downlink Null-Formation Using Receiving Antenna Selection in MIMO/SDMA", Technical Search Report of Electric Information Communication Academic Conference, Feb. 28, 2002, vol. 101, No. 683, pp. 17-22, RCS 2001-286.

Sandeep Chennakeshu et al., "A comparison of diversity schemes for a mixed-mode slow frequency-hopped cellular system," Global Telecommunications Conference, 1993, including a Communications Theory Mini-Conference. Technical Program Conference Record, IEEE in Houston. Globecom 93., IEEE, Nov. 29, 1993, pp. 1749-1753.

Sari, et al., "Transmission Techniques for Digital Terrestrial TV Broadcasting," IEEE Communications Magazine, Feb. 1995, pp. 100-109.

Schnell et al., "Application of IFDMA to Mobile Radio Transmission",IEEE 1998 International Conference on Universal Personal Communications,vol. 2, Oct. 5-9, 1998,pp. 1267-1272.

Schnell et al.,: "A Promising New Wideband Multiple-Access Scheme for Future Mobile Communications Systems" European Transactions on Telecommunications, vol. 10, No. 4, Jul. 1999, pp. 417-427.

Shattil et al., "Array Control Systems for Multicarrier Protocols Using a Frequency-Shifted Feedback Cavity", Radio and Wireless Conference EEE, Aug. 1-4, 1999.

Sorger U., et al., "Interleaved FDMA-A New Spread-Spectrum Multiple-Access Scheme, XP010284733," Communications, Conference Record, IEEE, Atlanta, GA, 1998, 1013-1017.

Taiwanese Search report—095142631—TIPO—Aug. 1, 2010.
Taiwanese Search report—096100636—TIPO—Aug. 4, 2010.

Tellado, "Multicarrier Modulation with Low Par," Kluwer Academic, Dordrecht, NL, XP-002199500, 2000, pp. 6-11 and 55-60.

Tellambura, "Use of m-sequences for OFDM Peak-to-Average Power Ratio Reduction," Electronics Letters, vol. 33, No. 15, Jul. 17, 1997, pp. 1300-1301.

"The TLS Protocol", Version 1.0, Network Working Group, Request for Comments 2246, pp. 1-100 (Jan. 1999).

TIA/EIA/IS-2000 Standards for CDMA2000 Spread Spectrum Systems 3GPP2 CS0001-0 Version Jul. 10, 1999.

TIA/EIA/IS-95, Mobile Station-Base Station Compatibility Standard for Dual-Mode Wideband Spread Spectrum Cellular System, Jul. 1993, Sections 6-25-6-26.

TIA-1121.001 "Physical Layer for Ultra Mobile Broadband (UMB) Air Interface Specification," 3GPP2 C.S0084-001-0, Version 2.0 (Aug. 2007).

TIA-1121.002 "Medium Access Control Layer for Ultra Mobile Broadband (UMB) Air Interface Specification," 3GPP2 C.S0084-002-0, Version 2.0 (Aug. 2007).

Tomcik J, "MBFDD and MBTDD Wideband Mode: Technology Overview, XP002429968," IEEE 802.20 Working Group Mobile Broadband Wireless Access, Jan. 6, 2006, 1-109.

Tomcik, T.: "QTDD Performance Report 2", IEEE C802.20-05/88, IEEE 802.20 Working Group on Mobile Broadband Wireless Access, http://ieee802.org/20/, pp. 1-56, XP002386798 (Nov. 15, 2005).

Toufik, I. et al., Channel allocation algorithms for multi-carrier systems, Vehicular Technology Conference 2004, VTC2004-Fall, 2004

IEEE 60th Los Angeles, CA, USA Sep. 26-29, 2004, Piscataway, NJ, USA IEEE, Sep. 26, 2004, pp. 1129-1133, XP010786798.
Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Yun et al., "Performance of an LPDC-Coded Frequency-Hopping QFDMA System Based on Resource Allocation in the Uplink" Vehicular Technology—Conference 2004. VTO 2004-Spring, 2004 IEEE 59th Milan, Italy May 17-19, 2004, Piscataway, NJ, USA, vol. 4, May 17, 2004. pp. 1925-1928. XP010766497.
Zekri, et al., "DMT Signals with Low Peak-to-Average Power Ratio," Proceedings, IEEE International Symposium on Computers and Communications, Jul. 6-8, 1999, pp. 362-368.
Nokia, "Uplink Considerations for UTRA LTE", 3GPP R1-050251,3GPP, Apr. 4, 2005, pp. 1-9.
NTT DoCoMo, "Downlink Multiple Access Scheme for Evolved UTRA", 3GPP R1-050249,3GPP, Apr. 4, 2005, pp. 1-8.
B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-106.
"European Search Report—EP10011743, Search Authority—Munich Patent Office, Dec. 20, 2010".
European Search Report—EP10012081, Search Authority—Munich Patent Office, Dec. 17, 2010
European Search Report—EP10012082, Search Authority—Munich Patent Office, Dec. 20, 2010.
European Search Report—EP10012083, Search Authority—Munich Patent Office, Dec. 30, 2010.
Groe, J., et al., "CDMA Mobile Radio Design," Sep. 26, 2001, Artech House, Inc. Norwood, MA, pp. 257-259.
Guo, K. et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Taiwan Search Report—TW095129021—TIPO—May 24, 2011.
Taiwanese Search Report—095139893—TIPO—Dec. 30, 2010.
Translation of Office Action in Chinese Application 2006800295980 corresponding to U.S. Appl. No. 11/260,895, citing CN1346221 and CN1383631 dated Feb. 16, 2011.
Translation of Office Action in Japan application 2008-538193 corresponding to U.S. Appl. No. 11/261,065, citing JP11196109, JP10322304 and JP09008725 dated Mar. 8, 2011.
Translation of Office Action in Korean application 10-2007-7031029 corresponding to U.S. Appl. No. 11/260,931, citing US20030202491 and KR20040063057 dated Jan. 28, 2011.
Translation of Office Action in Canadian application 2625987 corresponding to U.S. Appl. No. 11/261,065, citing CA2557369 dated Apr. 11, 2011.
Translation of Office Action in Chinese application 200680040236.1 corresponding to U.S. Appl. No. 11/261,065, citing US20040048609 and CN1402916 dated Feb. 18, 2011.
Translation of Office Action in Chinese application 200680048265.2 corresponding to U.S. Appl. No. 11/260,931, citing US6904097, WO2004095851, CN1344451 dated Jan. 26, 2011.
Translation of Office Action in Chinese application 200680048832.4 corresponding to U.S. Appl. No. 11/261,158, citing CN1132474 dated Dec. 31, 2010.
Translation of Office Action in Japanese Application 2008-514880 corresponding to U.S. Appl. No. 11/445,377, citing JP2007519281 and JP2006505172 dated Nov. 9, 2010.
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.

Translation of Office Action in Japanese Application 2008-529216 corresponding to U.S. Appl. No. 11/261,159, citing GB2348776 , WO2004098222, WO2005065062 and WO2004102815.Dated Jan. 11, 2011.
Translation of Office Action in Japanese application 2008-538181 corresponding to U.S. Appl. No. 11/511,735, citing WO04064295, JP2002515203, JP8288927, JP7336323 and JP200157545 dated Jan. 25, 2011.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Yongmei Dai,; Sumei Sun; Zhongding Lei; Yuan Li.: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS. 2004.1388940.
Chennakeshu, et al. "Capacity Analysis of a TDMA-Based Slow-Frequency-Hopped Cellular System," IEEE Transaction on Vehicular Technology, vol. 45., No. Aug. 3, 1996, pp. 531-542.
Chiani, et al. "Outage Evaluation for Slow Frequency-Hopping Mobile Radio Systems" IEEE Transactions on Communications, vol. 47, No. 12, Dec. 1999, pp. 1865-1874.
Choi, et al., "Design of the Optimum Pilot Pattern for Channel Estimation in OFDM Systems," Global Telecommunications Conference, IEEE Communications Society, Globecom, Dallas, Texas (2004), p. 3661-3665.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Das, Arnab, et al. "Adaptive, asynchronous incremental redundancy (A-IR) with fixed transmission time intervals TTI for HSDPA." IEEE, pp. 10-83-1087.
Das et al., "On the Reverse Link Interference Structure for Next Generation Cellular Systems," Global Telecommunications Conference, 2004. GLOBECOM '04, IEEE, vol. 5 IEEE Nov. 29-Dec. 3, 2004, pp. 3068-3072.
Digital cellular telecommunications system (Phase 2+); Mobile radio interface layer 3 specification (GSM 0408 version 771 Release 1998); ETSI EN 300 940 V777 (Oct. 2000), pp. 1,2,91-93.
Dinis R; Ralconer D; Tonglam C; Sabbaghian M: "A Multiple Access Scheme for the Uplink of Broadband Wireless Systems" Global Telecommunications Conference, 2004. GLOBECOM ''04. IEEE Dallas, TX, USA Nov. 29-Dec. 3, 2004, vol. 6, pp. 3808-3812, XP010758449 Piscataway, NJ, USA, IEEE.
Don Torrieri, "Cellular Frequency-Hopping CDMA Systems," IEEE Vehicular Technology Conference, May 16, 1999, pp. 919-925.
Favre et al: "Self-Adaptive Transmission Procedure" IBM Technical Disclosure Bulletin, IBM Corporation, Sep. 1976, vol. 19, No. 4, pp. 1283-1284, New York, New York.
Fuchs, et al., "A Novel Tree-Based Scheduling Algorithm for the Downlink of Multi-User MIMO Systems with ZF Beamforming," IEEE International Conference on Acoustics, Speech, and Signal Processing, Philadelphia, pp. 1121-1124, Mar. 18-23, 2005.
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Ken Murakami et al., "Status Toward Standardization at IEEE 802. 3ah and items on the construction of GE-PON system ," Technical Report of the Institute of Electronics, Information and Communication Engineers, Jun. 13, 2003, vol. 103, No. 124, pp. 1-6, IN2003-24.
Siemens, "Evolved UTRA uplink scheduling and frequency reuse" [online], 3GPP TSG-RAN WG1 # 41 R1-050476, Internet <URL:http://www.3gpp.org/ftp/tsg¯ran/WG1¯RL1/TSGR1¯41/ Docs/R1-050476.zip>, May 9, 2005.
Taiwan Search Report—TW095109023—TIPO—Feb. 2, 2012.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.

Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.

Alcatel-Lucent, et al., "Dedicated Reference Signals for Precoding in E-UTRA Downlink" 3GPP Draft; R1-071718, 3rd Generation Partnership Project (3GPP), Mobile Competence Centre; 650, Route Des Lucioles; F-06921 Sophia-Antipolis Cedex; France, vol. RAN WG1, No. St. Julian; 20070403, Apr. 3, 2007, XP050105640 [retrieved on Apr. 3, 2007].

European Search Report—EP10184156—Search Authority—Munich—Jun. 14, 2012 (050676U2EPD1D2).

Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.

Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.

Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.

Jim Tomcik, QFDD and QTDD: Technology Overview, IEEE 802.20 Working Group on Mobile Broadband Wireless Access, Oct. 28, 2005, pp. 48-50, URL, Http://www.IEEE802.org/20/contribs/C802.20-05-68.zip.

Nokia: "Compact signalling of multi-code allocation for HSDPA", version 2,3GPP R1-02-0018, Jan. 11, 2002.

Sethi M, et al., "Code Reuse DS-CAMA- A Space Time Approach", Proceedings of the 2002 IEEE International Conference on Acoustics, Speech, and Signal Processing (ICASSP), pp. 2297-2300, May 13-17, 2002.

European Search Report—EP11158564—Search Authority—Munich—May 25, 2011.

CHANNEL STRUCTURES FOR A QUASI-ORTHOGONAL MULTIPLE-ACCESS COMMUNICATION SYSTEM

CLAIM OF PRIORITY

This application for patent is a continuing application of, and claims the benefit of priority from, U.S. patent application Ser. No. 11/129,140, entitled "Channel Structures for a Quasi-Orthogonal Multiple-Access Communication System," filed on May 13, 2005, which claims priority to Provisional Application Ser. No. 60/662,634, entitled "Channelization of SDMA/OFDMA Systems," filed Radiated Power Control for a Multi-Antenna Transmission" and filed on Mar. 16, 2005, which is assigned to the assignee of this application and is fully incorporated herein for all purposes.

BACKGROUND

I. Field

The present disclosure relates generally to communication, and more specifically to data transmission in a multiple-access communication system.

II. Background

A multiple-access system can concurrently communicate with multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This is often achieved by multiplexing the multiple data transmissions on each link to be orthogonal to one another in time, frequency and/or code domain. Complete orthogonality among the multiple data transmissions is typically not achieved in most instances due to various factors such as channel conditions, receiver imperfections, and so on. Nevertheless, the orthogonal multiplexing ensures that the data transmission for each terminal minimally interferes with the data transmissions for the other terminals.

The number of terminals that may communicate with the multiple-access system at any given moment is typically limited by the number of physical channels available for data transmission, which in turn is limited by the available system resources. For example, the number of physical channels is determined by the number of available orthogonal code sequences in a code division multiple access (CDMA) system, the number of available frequency subbands in a frequency division multiple access (FDMA) system, the number of available time slots in a time division multiple access (TDMA) system, and so on. In many instances, it is desirable to allow more terminals to simultaneously communicate with the system in order to improve system capacity. There is therefore a need in the art for techniques to support simultaneous transmissions for more terminals in a multiple-access system.

SUMMARY

Techniques for assigning system resources in a manner to control intra-cell interference and to achieve higher system capacity are described herein. In an embodiment, a channel structure with at least two channel sets is defined. Each channel set contains multiple channels and is associated with a specific mapping of the channels to the system resources available for data transmission. Each channel set may be defined based on a channel tree having a hierarchical structure. For example, the channel tree may include multiple "base" channels and multiple "composite" channels. The base channels may be mapped to the available system resources (e.g., using frequency hopping). Each composite channel may be associated with at least two base channels. For the channel tree, each channel that is assigned to a terminal restricts at least one other channel from being assigned. Various channel structures having different interference characteristics may be formed by partitioning the channel tree in different manners and/or using different channel-to-resource mappings for the channel sets, as described below. For example, intra-cell interference diversity may be achieved by defining the mapping for each channel set to be pseudo-random with respect to the mapping for each remaining channel set.

In each scheduling interval, terminals are scheduled for transmission on the forward and/or reverse link. The scheduled terminals are assigned channels from the channel sets. The scheduling and/or channel assignment may be based on pertinent information for the terminals such as their channel estimates, signal-to-noise-and-interference ratio (SNR) estimates, quality of service (QoS) requirements, handoff status, and so on. Multiple terminals may use the same system resources and their overlapping transmissions may be separated in the spatial domain. For the forward link (FL), data for overlapping terminals is spatially processed (e.g., for beamforming) based on their FL channel estimates and then transmitted from multiple antennas. For the reverse link (RL), multiple transmissions from overlapping terminals are received via the multiple antennas. The received symbols for the overlapping terminals are then spatially processed based on their RL channel estimates to recover the transmission from each terminal.

Various aspects and embodiments of the invention are described in further detail below.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The channel structures described herein may be used for various multiple-access communication systems such as (1) a CDMA system that transmits data for different users using different orthogonal code sequences, (2) an FDMA system that transmits data for different users on different frequency subbands, (3) a TDMA system that transmits data for different users in different time slots, (4) a spatial division multiple access (SDMA) system that transmits data for different users on different spatial channels, (5) an orthogonal frequency division multiple access (OFDMA) system that transmits data for different users on different frequency subbands, and so on. An OFDMA system utilizes orthogonal frequency division multiplexing (OFDM), which is a multi-carrier modulation technique that partitions the overall system bandwidth into multiple (K) orthogonal frequency subbands. These subbands are also called tones, subcarriers, bins, frequency channels, and so on. Each subband is associated with a respective subcarrier that may be modulated with data.

The channel structures described herein may also be used for time division duplexed (TDD) and frequency division duplexed (FDD) systems, for the forward and reverse links, with or without frequency hopping (FH), and so on. For clarity, the channel structures are described below for a specific quasi-orthogonal multiple-access system that utilizes a combination of SDMA and OFDMA. This system is called a quasi-orthogonal division access (QODA) system.

Figure 1:
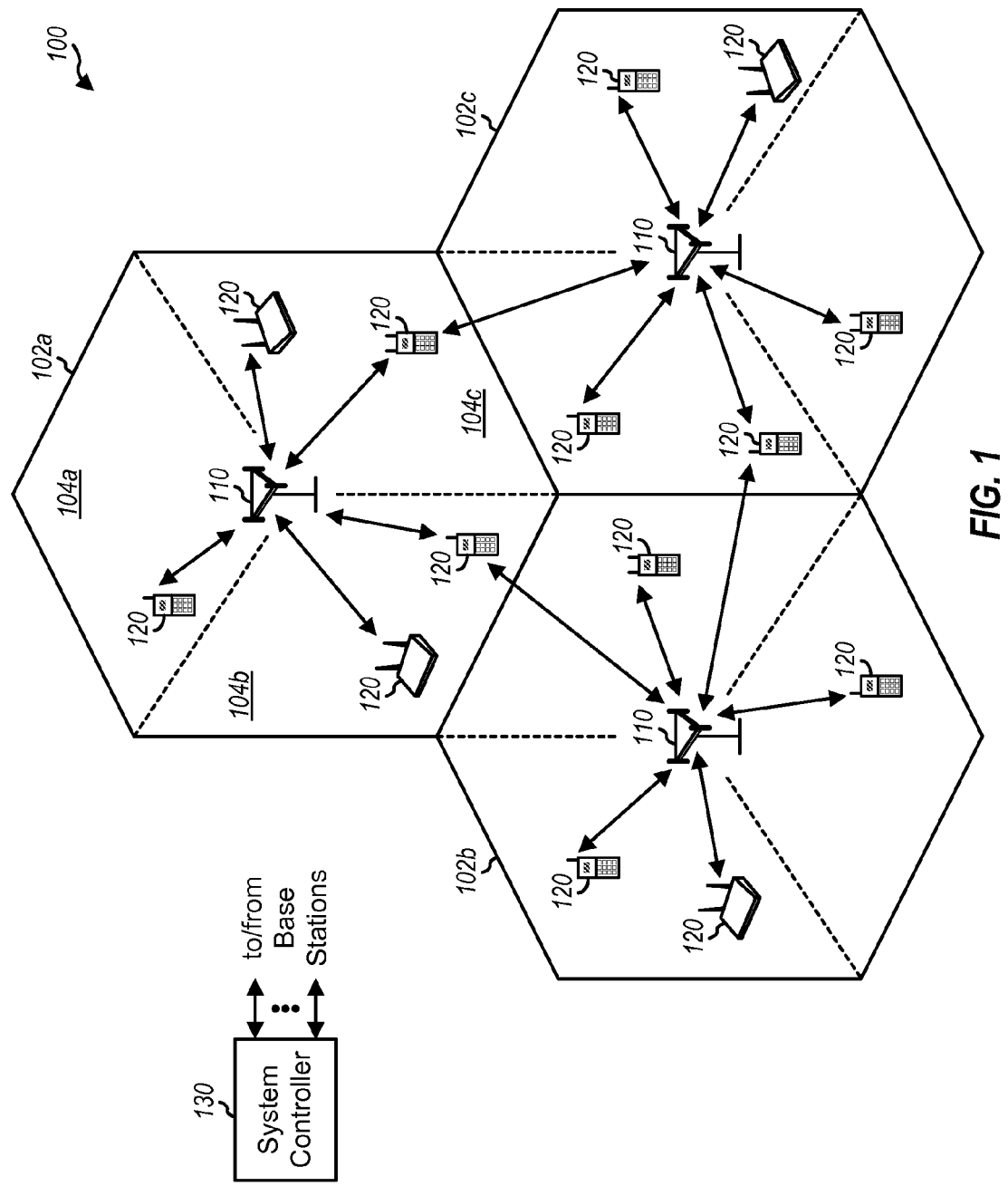
FIG. 1 shows a system with multiple base stations and multiple terminals.

FIG. 1 shows a QODA system 100 with multiple base stations 110 and multiple terminals 120. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, the base station coverage area may be partitioned into multiple smaller areas (e.g., three smaller areas 104a, 104b, and 104c) that normally overlap at the edges. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. For simplicity, in the following description, the term "base station" is used generically for both a fixed station that serves a cell and a fixed station that serves a sector. A serving sector is a sector with which a terminal communicates.

A terminal may be fixed or mobile and may also be called a mobile station, a wireless device, a user equipment, or some other terminology. The terms "terminal" and "user" are used interchangeably herein. Each terminal 120 may communicate with zero, one, or multiple base stations at any given moment. A terminal communicates with multiple sectors of the same cell for "softer" handoff and with multiple cells for "soft" handoff.

Each base station 110 is equipped with multiple antennas that may be used for data transmission and reception. Each terminal may be equipped with one or multiple antennas for data transmission and reception. The multiple antennas at each base station represent the multiple-input (MI) for forward link transmissions and the multiple-output (MO) for reverse link transmissions. If multiple terminals are selected for simultaneous transmission, then the multiple antennas for the selected terminals collectively represent the multiple-output for forward link transmissions and the multiple-input for reverse link transmissions.

The QODA system may define physical channels to facilitate allocation and use of the available system resources. A physical channel is a means for sending data at a physical layer and may also be called a channel, a traffic channel, a transmission channel, a data channel, and so on. The physical channels may be defined for any type of system resources such as subbands, time intervals, code sequences, and so on.

Figure 2:
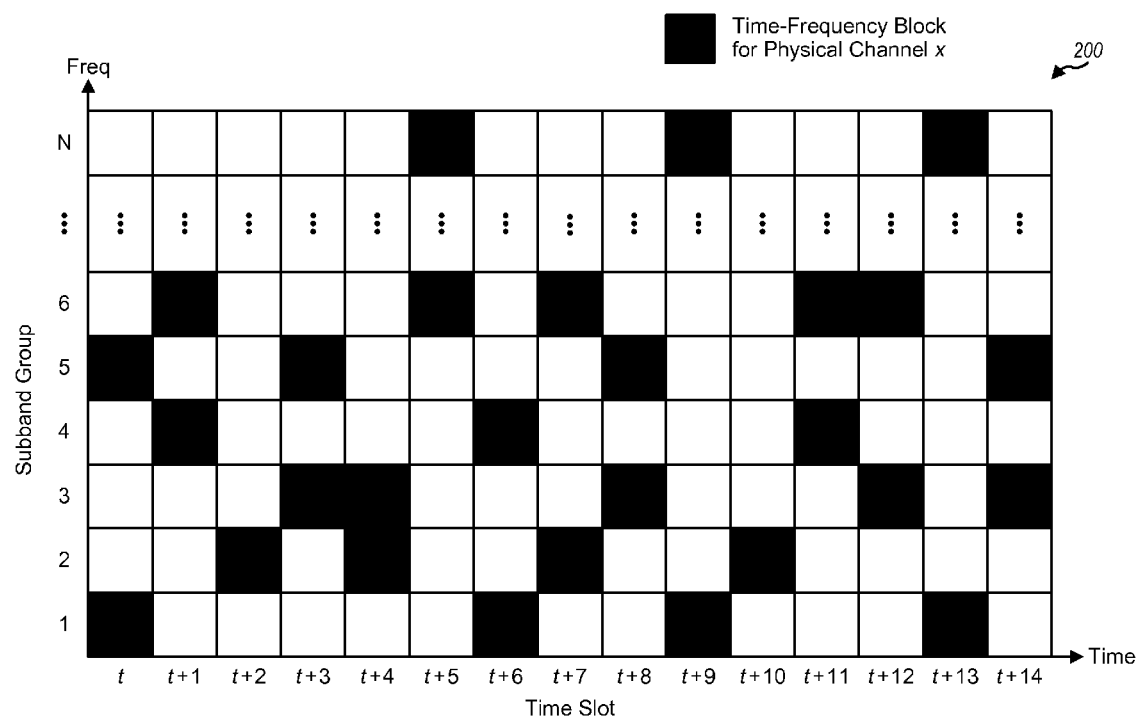
FIG. 2 shows a mapping of a physical channel to time-frequency blocks.

FIG. 2 shows an exemplary partitioning of the available system resources (time and frequency) into time-frequency blocks. A time-frequency block may also be called a transmission unit or by some other terminology. Each time-frequency block corresponds to a specific subband set in a specific time slot. A subband set may include one or multiple subbands, which may be contiguous or distributed across the system bandwidth. A time slot may span one or multiple symbol periods. N time-frequency blocks are available in each time slot, where N>1.

FIG. 2 also shows an exemplary mapping of a physical channel to the available system resources in the QODA system. The physical channel is mapped to a specific sequence of time-frequency blocks. The time-frequency blocks for the physical channel may hop across frequency in different time slots to achieve frequency diversity, as shown in FIG. 2. The physical channel may be associated with a frequency hopping (FH) pattern that indicates one or more specific time-frequency blocks (e.g., two time-frequency blocks for the example in FIG. 2) to use for the physical channel in each time slot. The physical channel may be mapped to time-frequency blocks in consecutive time slots (as shown in FIG. 2) or non-consecutive time slots.

The QODA system may define physical channels having different transmission capacities in order to efficiently assign system resources to terminals. The QODA system may also utilize a channel structure that facilitates both the mapping of physical channels to system resources and the assignment of physical channels to users.

Figure 3:
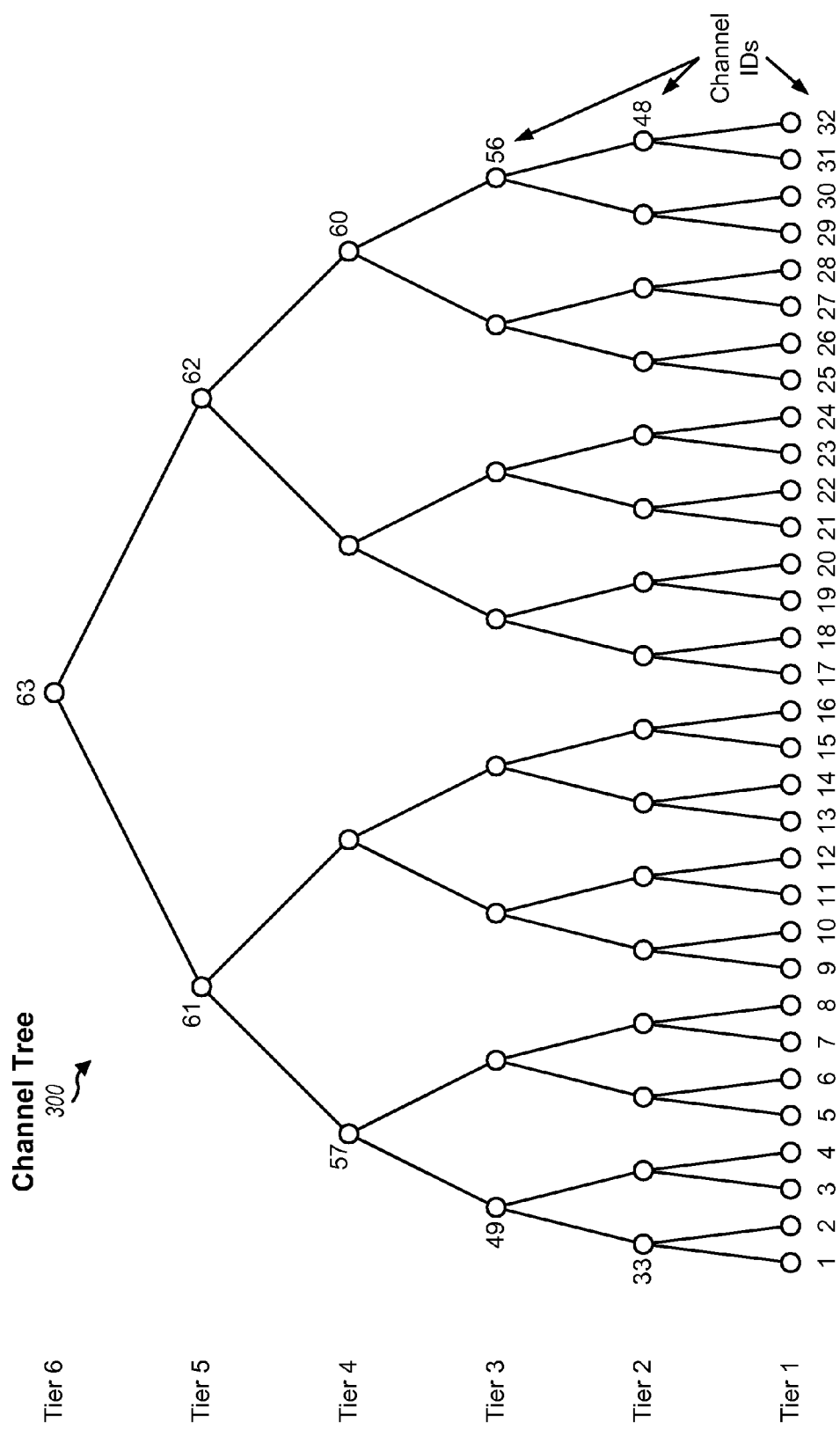
FIG. 3 shows a binary channel tree.

FIG. 3 shows a binary channel tree 300 that may be used to define physical channels. In channel tree 300, each node represents a physical channel that is assigned a unique channel identifier (ID). Channel tree 300 has six tiers of physical channels. The 32 physical channels at the bottom tier 1 are assigned channel IDs of 1 through 32, the 16 physical channels at tier 2 are assigned channel IDs of 33 through 48, the eight physical channels at tier 3 are assigned channel IDs of 49 through 56, the four physical channels at tier 4 are assigned channel IDs of 57 through 60, the two physical channels at tier 5 are assigned channel IDs of 61 and 62, and the single physical channel at the top tier 6 is assigned a channel ID of 63. The 32 base physical channels (or simply, the base channels) at the bottom tier 1 are associated with the smallest assignment of system resources. Each base channel is associated with a specific sequence of time-frequency blocks, e.g., as shown in FIG. 2. The 32 base channels are orthogonal to one another so that no two base channels use the same time-frequency block (i.e., the same subband set in the same time slot). The 31 composite physical channels (or simply, the composite channels) above the base channels are each associated with multiple base channels.

Channel tree 300 has a hierarchical structure. Each physical channel at each tier (except for the bottom tier 1) is composed of two "children" physical channels in the next lower tier. For example, physical channel 49 at tier 3 is composed of physical channels 33 and 34 at tier 2 and is also composed of physical channels 1 through 4 at tier 1. The time-frequency blocks for each physical channel are composed of the time-frequency blocks for all children physical channels. Each physical channel (except for physical channel 63 at the top tier 6) is also a subset of another physical channel. For example, physical channel 1 is a subset of physical channel 33, which is a subset of physical channel 49, and so on.

The channel tree structure places certain restrictions on the use of the physical channels for an orthogonal system. For each physical channel that is assigned, all physical channels that are subsets of the assigned physical channel and all physical channels for which the assigned physical channel is a subset are restricted. The restricted physical channels are not available for use concurrently with the assigned physical channel so that no two physical channels use the same system resource at the same time. For example, if physical channel 49 is assigned, then physical channels 1 through 4, 33, 34, 57, 61 and 63 are restricted and are not used concurrently with physical channel 49 if orthogonality is desired. Each physical channel that is assigned thus restricts at least one other physical channel from being assigned.

FIG. 3 shows an exemplary channel tree that may be used to define physical channels. Other channel trees may also be used, and this is within the scope of the invention. For example, non-binary channel trees containing physical channels that are associated with more than two physical channels in one or more lower tiers may also be used. In general, a channel tree may have any number of base channels, any number of composite channels, and any mapping of composite channels to base channels.

In the QODA system, the transmissions for different users on each link are sent on different time-frequency blocks whenever possible in order to maintain orthogonality among these transmissions. To increase system capacity, multiple users may use the same time-frequency block whenever the available time-frequency blocks are insufficient to serve all users. As used herein, "overlapping" refers to multiple transmissions sent on the same time-frequency block, "overlapping transmissions" refer to transmissions sent on the same time-frequency block, and "overlapping users" and "overlapping terminals" are users using the same time-frequency block. The overlapping of users may be achieved with the following schemes:

1. Randomly overlap users in each time slot to randomize the interference observed by each user and to maximize intra-cell interference diversity.
2. Overlap multiple users on the same time-frequency blocks throughout a transmission.
3. Divide users into groups, maintain orthogonality among the users in the same group, and randomly overlap the users in different groups.
4. Divide users into groups, randomly overlap the users in each group, and maintain orthogonality among the users in different groups.
5. Overlap handoff users with non-handoff users in neighboring sectors.

Intra-cell interference refers to interference observed by a user from other users within the same cell. Intra-cell interference can come from (1) multiple users in the same sector using the same time-frequency block via SDMA and (2) users in other sectors of the same cell. Intra-cell interference has a large impact on performance for SDMA and may be controlled using the overlapping schemes described herein.

Scheme 1 can provide maximum intra-cell interference diversity for the users. Scheme 2 is advantageous if multiple transmissions on the same time-frequency blocks can be separated using receiver spatial processing techniques. Scheme 3 is a compromise of schemes 1 and 2, where spatially correlated users may be placed in the same group so that they can maintain orthogonality with each other and achieve interference diversity from users in the other groups. Scheme 4 can support users with different requirements. The overlapping schemes may be implemented with various channel structures, as described below.

In an embodiment, a channel structure is defined by duplicating a channel tree to obtain L instances or copies of the channel tree, where L>1, and forming a channel set for each of the L channel tree instances. There is a one-to-one mapping between channel set and channel tree instance. Each channel set is associated with a specific mapping of base channels to time-frequency blocks. For random overlapping, the channel-to-resource mapping for each channel set is pseudo-random with respect to the mapping for each of the other L−1 channel sets. For example, each channel set may be associated with a different set of frequency hopping patterns. The base channels in each channel set are orthogonal to one another and are pseudo-random with respect to the base channels in each of the other L−1 channel sets.

Figure 4:
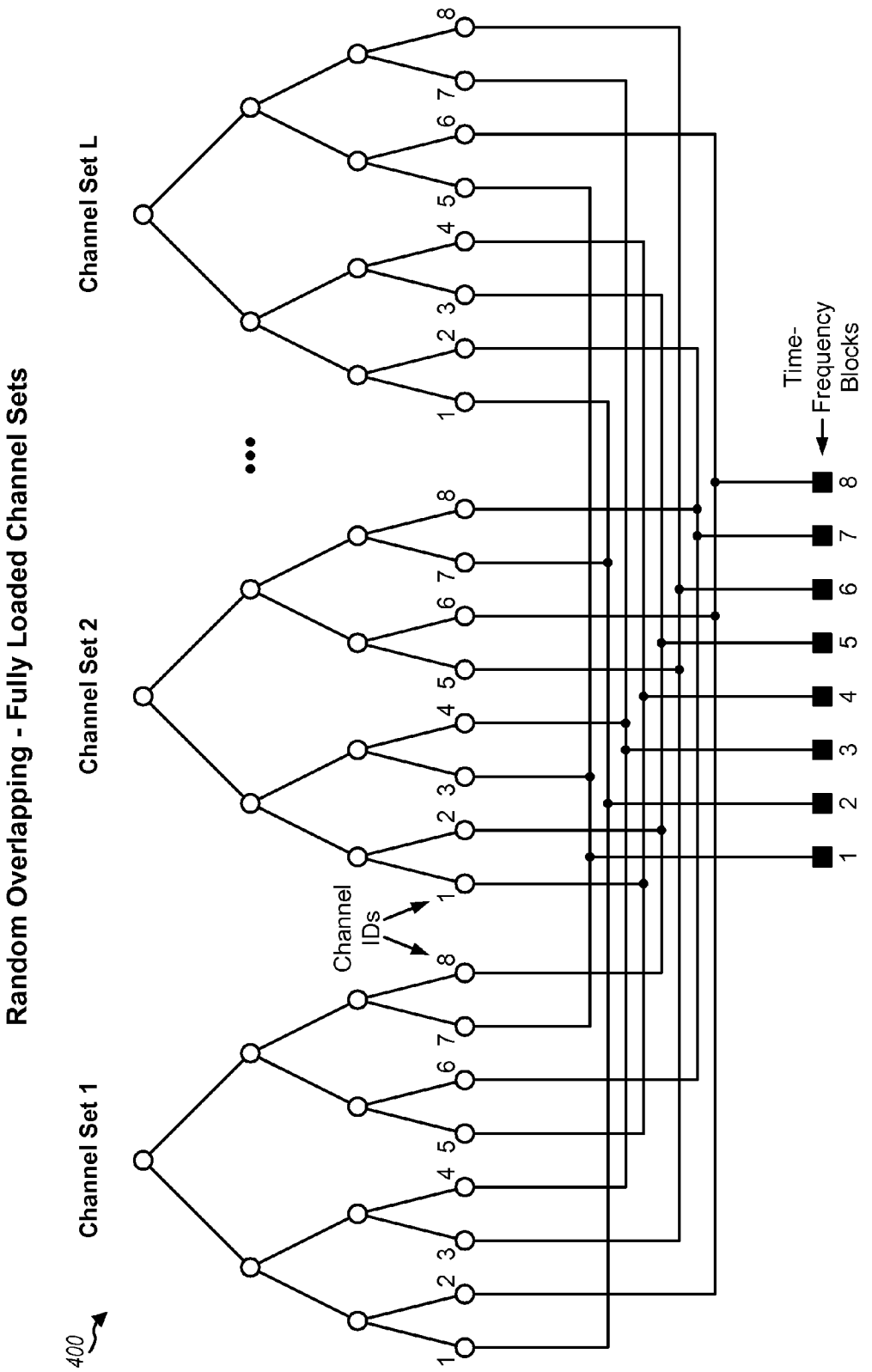
FIGS. 4, 5 and 6 show three channel structures for random overlapping with fully loaded, partially loaded, and sequentially loaded channel sets, respectively.

FIG. 4 shows a channel structure 400 for random overlapping with fully loaded channel sets. In this example, L channel sets are formed with L instances of a channel tree having eight base channels. The base channels are given channel IDs of 1 through 8. Each channel set is assigned a different set of frequency hopping patterns. The frequency hopping patterns for each channel set are orthogonal to one another and are pseudo-random with respect to the frequency hopping patterns for each of the other L−1 channel sets. Each base channel in each channel set is assigned one of the frequency hopping patterns for that channel set. The frequency hopping pattern for each base channel indicates the time-frequency block (if any) to use in each time slot.

For channel structure 400, all of the physical channels in each channel set are usable for transmission. A physical channel may or may not be used for transmission in a given time slot depending on whether or not (1) the physical channel is mapped to a time-frequency block in that time slot, (2) the physical channel is assigned to a user, and (3) a transmission is sent on the time-frequency block for/by the assigned user.

FIG. 4 also shows eight time-frequency blocks and the mapping of the eight base channels in each channel set to the eight time-frequency blocks in a specific time slot t. For example, base channel 7 in channel set 1, base channel 3 in channel set 2, and so on, and base channel 5 in channel set L are all mapped to time-frequency block 1 in time slot t. The mapping of the base channels to time-frequency blocks is different for another time slot and is determined by the frequency hopping patterns assigned to the base channels.

For channel structure 400, all base channels in the L channel sets may be assigned to different users and used for data transmission. If all of the base channels are assigned, then there are L overlapping users for each frequency-time block, and each user observes interference from L−1 other users. However, each user observes interference from different groups of L−1 users in different time slots due to the use of pseudo-random frequency hopping patterns for the L channel sets.

Channel structure 400 supports overlapping schemes 1 and 3. For scheme 1, the users may be randomly assigned with physical channels in the L channel sets. A user may be assigned physical channels from different channel sets in different time slots (e.g., based on the availability of the physical channels) but is not assigned multiple physical channels from different channel sets in the same time slot (to avoid self interference). For scheme 3, the users are placed in groups, each group is associated with one channel set, and all users in each group are assigned physical channels in the associated channel set. A user may be assigned different physical channels in the associated channel set in different time slots but is typically not moved to another group, e.g., unless the channel and/or operating conditions change.

Overlapping the users improves system capacity but also results in higher intra-cell interference. A tradeoff between system capacity and interference may be made by overlapping the users on a fraction of the system bandwidth.

Figure 5:
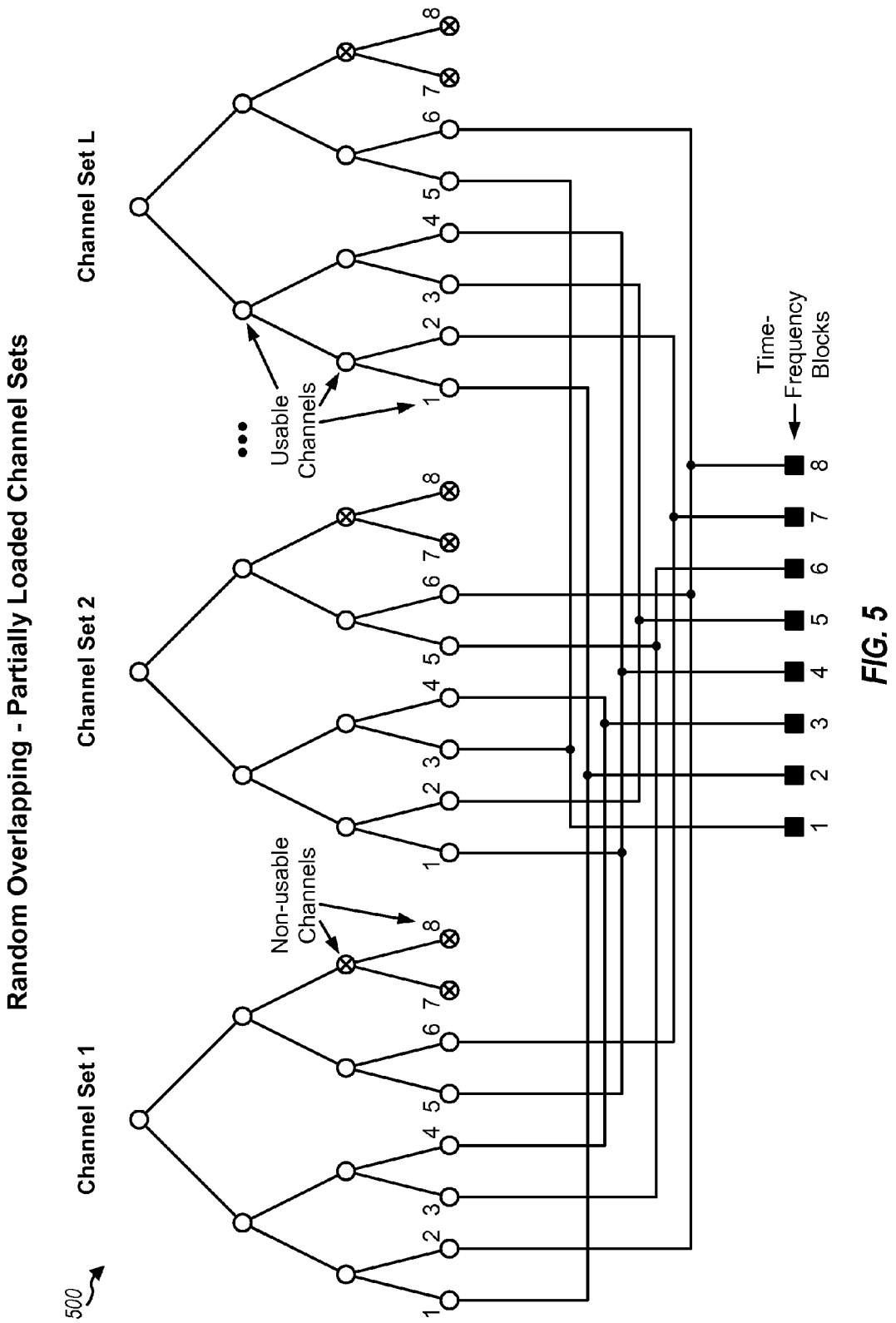

FIG. 5 shows a channel structure 500 for random overlapping with partially loaded channel sets. In this example, L channel sets are formed with L instances of a channel tree having eight base channels, and each channel set is associated with a different set of frequency hopping patterns, as described above for FIG. 4. For channel structure 500, each channel set has six usable base channels 1 through 6 and two non-usable base channels 7 and 8. The usable physical channels are indicated by unfilled circles, and the non-usable physical channels are indicated by crossed-out circles ⊗. A usable physical channel may be assigned to a user and used for transmission. A non-usable physical channel cannot be assigned and cannot be used for transmission.

FIG. 5 also shows eight time-frequency blocks and the mapping of the six usable base channels in each channel set to the eight time-frequency blocks in a specific time slot t. For example, base channel 3 in channel set 2, and so on, and base channel 5 in channel set L are all mapped to time-frequency block 1 in time slot t. The mapping of the usable base channels to time-frequency blocks is different for different time slots. With partial loading, each channel set does not use a fraction of the system bandwidth. All of the usable base channels observe the same intra-cell interference level through random frequency hopping. For the example shown in FIG. 5, each channel set is partially loaded and only uses 75% of the available time-frequency blocks. For this example, each base channel in each channel set overlaps with 1.5 other base channels on average.

Channel structure 500 also supports overlapping schemes 1 and 3. For scheme 1, the users may be randomly assigned the usable physical channels in the L channel sets. For scheme 3, the users are placed in groups, and the users in each group are assigned usable physical channels in the associated channel set.

FIG. 5 shows an embodiment in which all L channel sets have the same loading factor, which is 0.75 in this example. In another embodiment, each channel set is associated with a reuse factor that determines the loading level for that channel set. Different channel sets may be associated with different reuse factors. For example, channel set 1 may be associated with a reuse factor of 1.0 and all eight base channels in this channel set are usable, channel set 2 may be associated with a reuse factor of 0.75 and six base channels are usable, channel set 3 may be associated with a reuse factor of 0.5 and four base channels are usable, and so on. Different reuse factors for different channel sets result in different levels of overlapping across the channel sets, which can provide different QoS levels. For the example given above with channel sets 1, 2 and 3 having reuse factors of 1.0, 0.75 and 0.5, respectively, each base channel in channel set 1 overlaps with 1.25 other base channels on average, each base channel in channel set 2 overlaps with 1.5 other base channels on average, and each base channel in channel set 3 overlaps with 1.75 other base channels on average.

Figure 6:
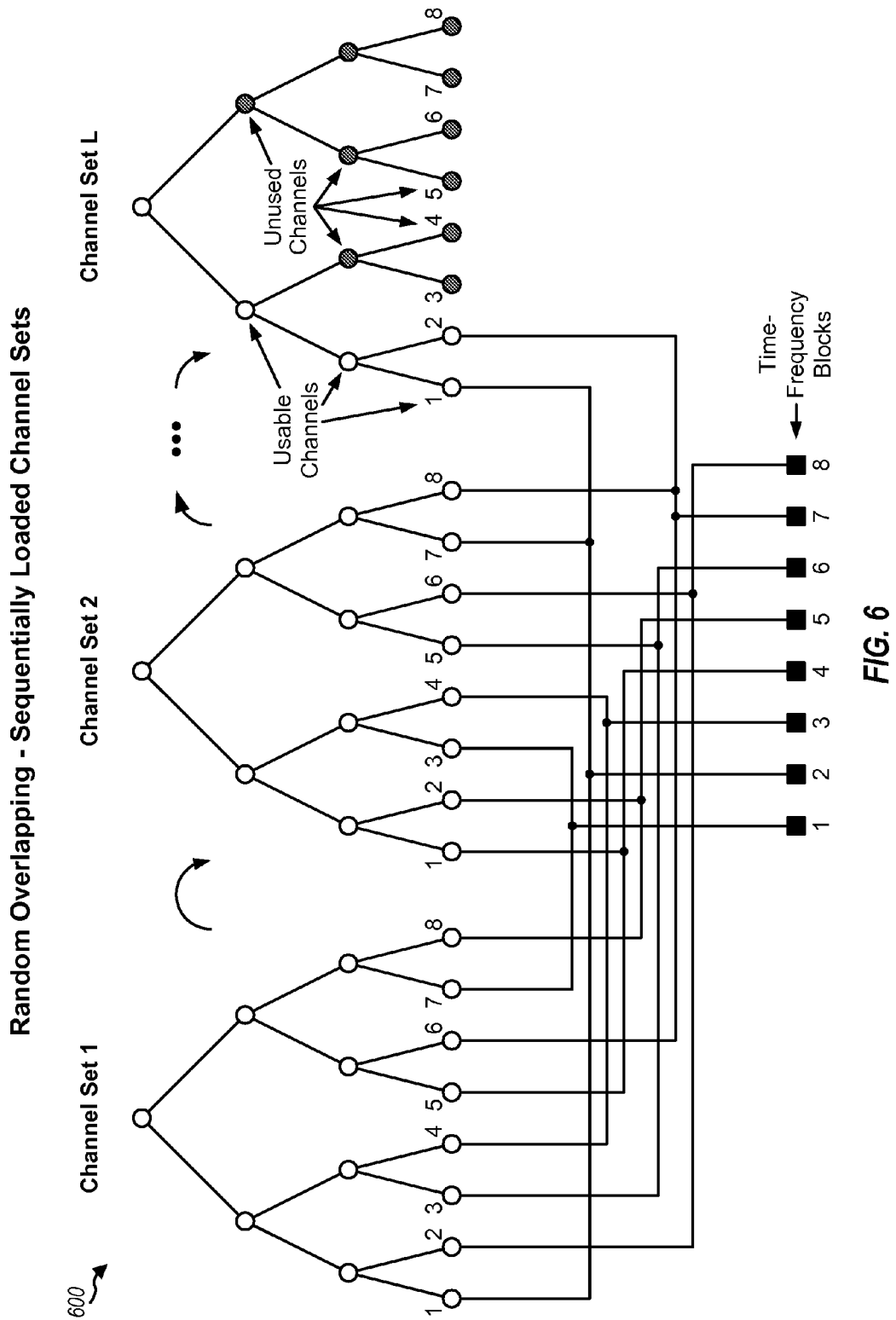

FIG. 6 shows a channel structure 600 for random overlapping with sequentially loaded channel sets. In this example, L channel sets are formed with L instances of a channel tree having eight base channels, and each channel set is assigned a different set of frequency hopping patterns, as described above for FIG. 4. For channel structure 600, the L channel sets are used in sequential order based on system loading. Thus, the physical channels in channel set 1 are assigned to users first, then the physical channels in channel set 2 are assigned to users next, if and as needed, and so on, and the physical channels in channel set L are assigned to users last, again if and as needed. Any number of channel sets may be in use at any given moment depending on the system loading. Channel set j is used only if channel sets 1 through j−1 are insufficient to serve the users. For the example shown in FIG. 6, all of the base channels in channel sets 1 through L−1 as well as base channels 1 and 2 in channel set L are assigned to the users, and only base channels 3 through 8 in channel set L are not used and are shown by darkened circles.

For channel structure 600, each channel set is fully used (if possible) before the next channel set is used. Channel structure 600 can also provide different QoS levels. For example, channel sets 1 and 2 may be fully used and only base channels 1 and 2 in channel set 3 may be used. In this case, each base channel in channel set 3 overlaps with two other base channels, and each base channel in channel sets 1 and 2 overlaps with only 1.25 other base channels on average. Sequential loading may also be used for channel structure 500 in FIG. 5.

Common overlapping may be achieved by duplicating a channel tree to obtain L instances of the channel tree, forming a channel set for each of the L channel tree instances, and using the same mapping of base channels to time-frequency blocks for all L channel sets. For example, a single set of frequency hopping patterns may be used for all L channel sets. For each channel set, each base channel in the channel set is assigned a different frequency hopping pattern, and all base channels in the channel set are orthogonal to one another. However, base channels x in all L channel sets use the same frequency hopping pattern. Base channels x (plural) include base channel x for channel set 1 through base channel x for channel set L, where $x \in \{1, \ldots, N\}$.

Figure 7:
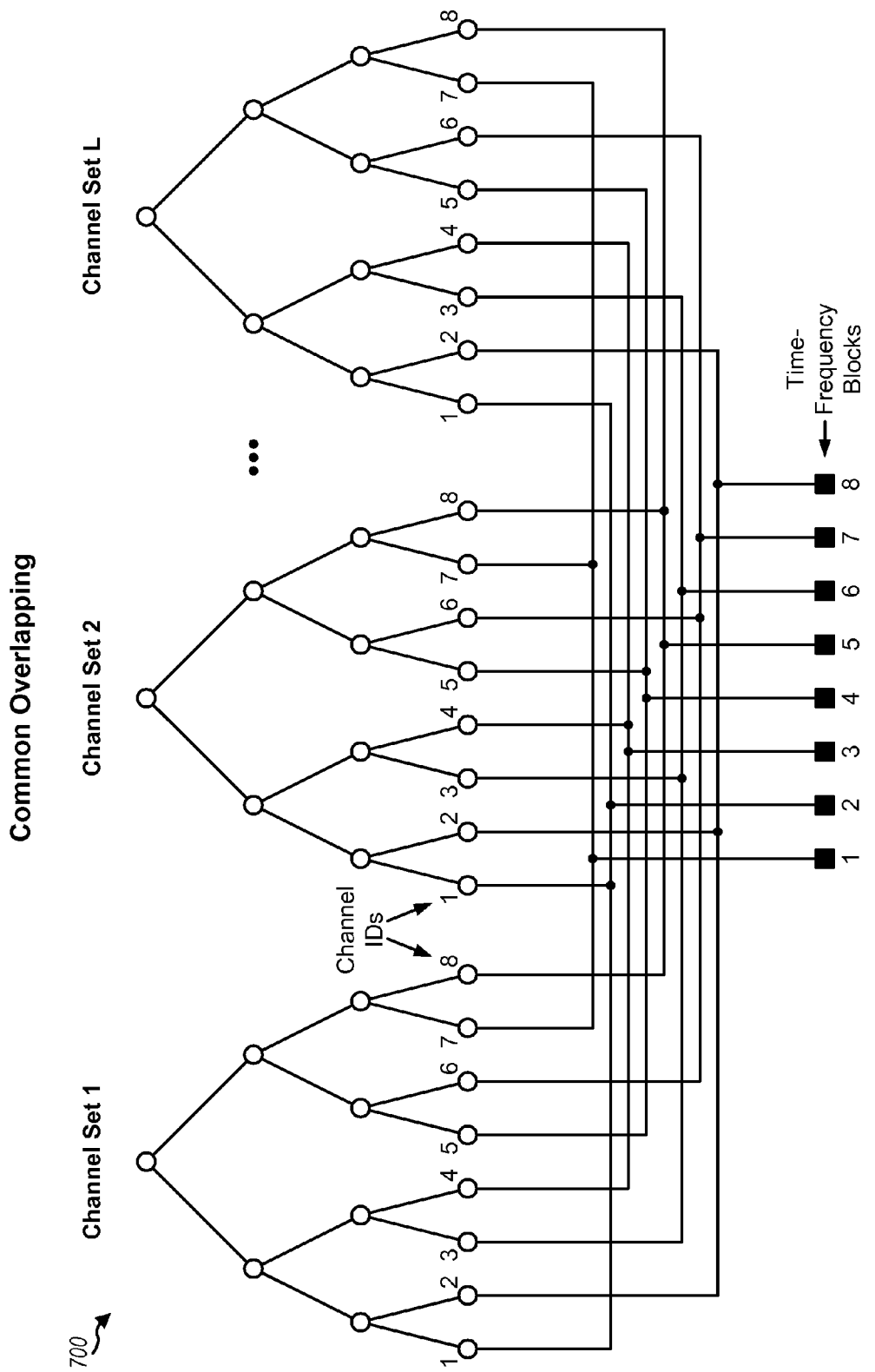
FIG. 7 shows a channel structure for common overlapping.

FIG. 7 shows a channel structure 700 for common overlapping. In this example, L channel sets are formed with L instances of a channel tree having eight base channels, and all L channel sets use the same set of frequency hopping patterns. Thus, base channels x for all L channel sets are mapped to the same sequence of time-frequency blocks. For the example in FIG. 7, in time slot t, base channels 7 for all channel sets are mapped to time-frequency block 1, base channels 1 for all channel sets are mapped to time-frequency block 2, and so on. The mapping of the base channels to time-frequency blocks is different for another time slot.

For channel structure 700, the users assigned with different base channels in the same channel set are orthogonal to one another. A user assigned with base channel x in one channel set continuously observes interference from other users assigned with base channels x in the other channel sets. Up to L users can exclusively reuse the same sequence of time-frequency blocks.

For common overlapping, base channels x in the L channel sets may be assigned to spatially compatible users, which are users that can be separated using receiver spatial processing techniques. Users that are not spatially compatible may be assigned different physical channels in the same channel set and would then be orthogonal to one another.

Figure 8:
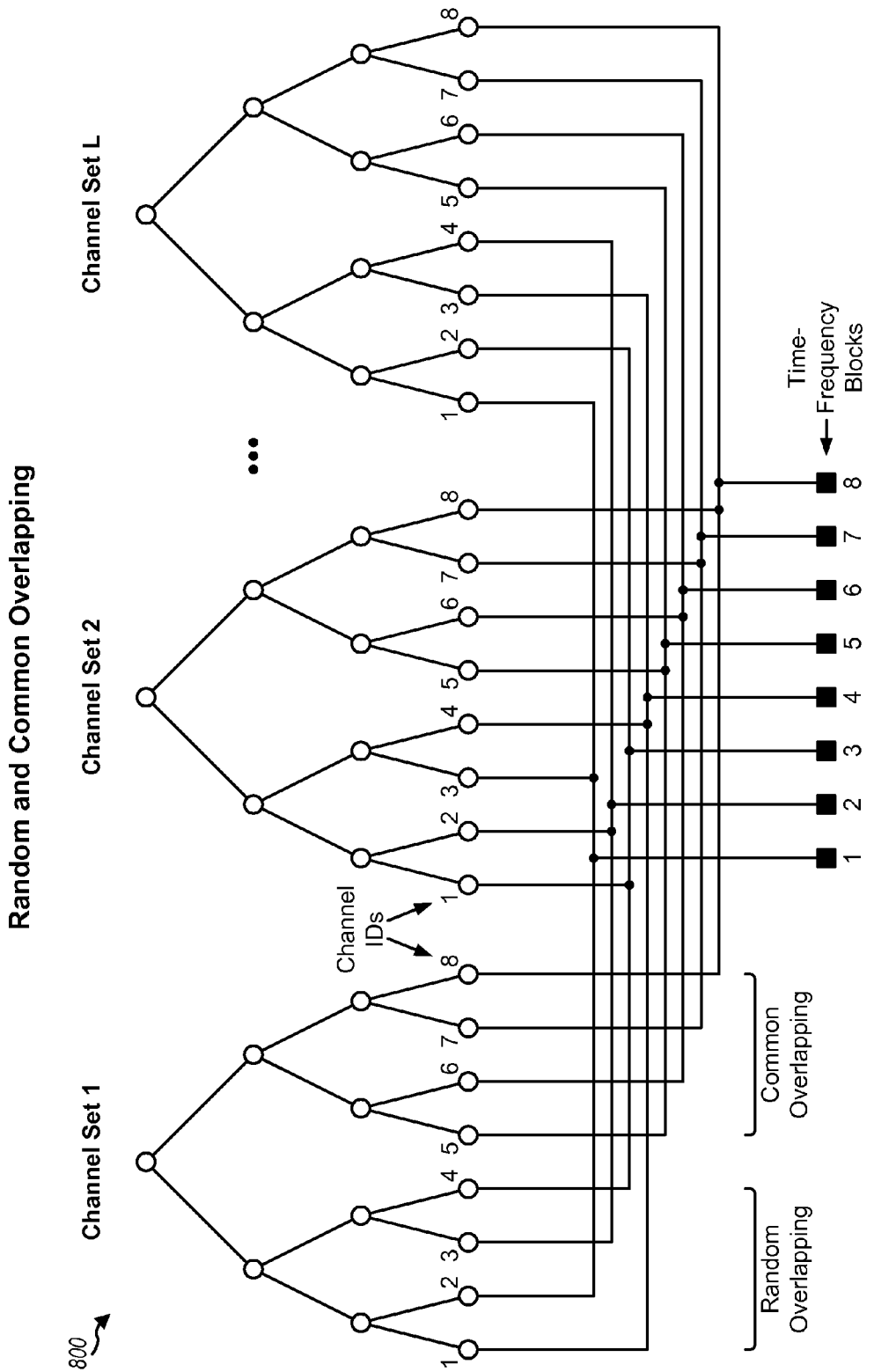
FIG. 8 shows a channel structure for random and common overlapping.

FIG. 8 shows a channel structure 800 for both random and common overlapping. In this example, L channel sets are formed with L instances of a channel tree having eight base channels. Random overlapping is used for a first channel subset containing base channels 1 through 4. Common overlapping is used for a second channel subset containing base channels 5 through 8. Each channel set is associated with (1) a different set of frequency hopping patterns for the first channel subset and (2) a common set of frequency hopping patterns for the second channel subset. For each channel set, the eight base channels are orthogonal to one another. Base channels 1 for the L channel sets are associated with different frequency hopping patterns and are pseudo-random with respect to each other. The same is also true for base channels 2, 3 and 4. Base channels 5 for the L channel sets are associated with the same frequency hopping pattern and share the same sequence of time-frequency blocks. The same is also true for base channels 6, 7 and 8.

For channel structure 800, spatially compatible users may be assigned physical channels in the second channel subset. Other users may be assigned physical channels in the first channel subset.

Figure 9:
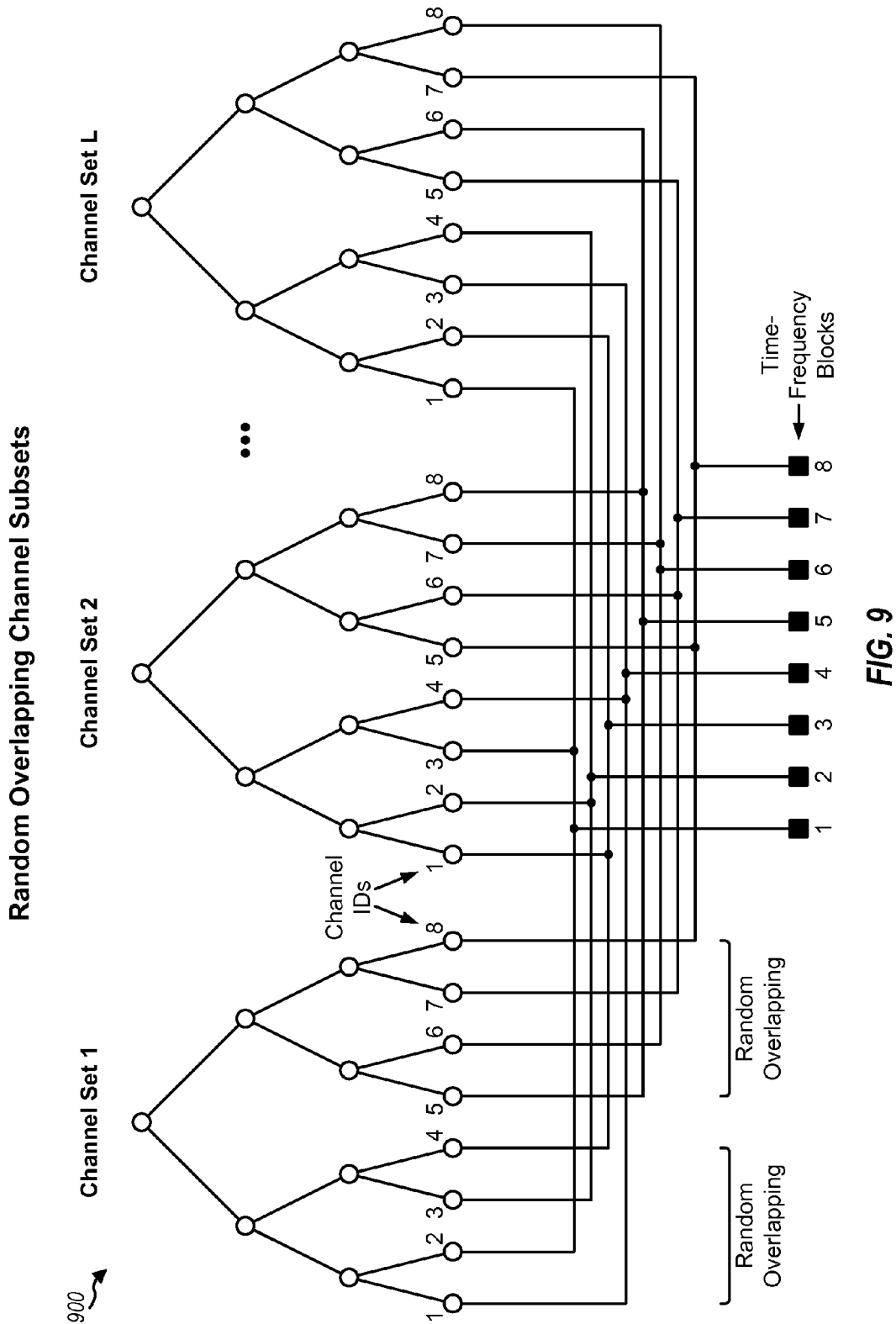
FIG. 9 shows a channel structure with random overlapping channel subsets.

FIG. 9 shows a channel structure 900 with multiple random overlapping channel subsets. In this example, L channel sets are formed with L instances of a channel tree having eight base channels. Random overlapping is used for a first channel subset containing base channels 1 through 4. Random overlapping is also used for a second channel subset containing base channels 5 through 8. Each channel set is associated with two sets of frequency hopping patterns for the two channel subsets. The base channels in the first channel subset for each channel set are pseudo-random with respect to the base channels in the first channel subset for each of the other L−1 channel sets. The same is also true for the second channel subset.

Channel structure 900 supports overlapping scheme 4. For scheme 4, the users are placed in two groups, each group is associated with one channel subset, and all users in each group are assigned physical channels in the associated channel subset. A user that is assigned a physical channel in the first channel subset in one channel set would observe (1) no interference from other users assigned with physical channels in the same channel subset of the same channel set, (2) no interference from other users assigned with physical channels in the other channel subset for all L channel sets, and (3) random interference from other users assigned with physical channels in the same channel subset for the other L−1 channel sets.

Exemplary channel structures have been described above in FIGS. 4 through 9. Other channel structures may also be defined based on the description provided herein. In general, a channel structure may have any number of channel sets, any number of channel subsets, any percentage of physical channels for each channel subset, any reuse factor for each channel set/subset, and any type and combination of overlapping (e.g., random and/or common) across the channel sets.

The channel structure for the QODA system may be defined once and thereafter remain static. Alternatively, the channel structure may be adaptively defined based on the composition of the users in the system and may be signaled to the users.

The random overlapping schemes shown in FIGS. 4, 5, 6, 8 and 9 rely on statistical multiplexing to obtain the average intra-cell interference behavior. The common overlapping schemes shown in FIGS. 7 and 8 allow for direct control of intra-cell interference. With common overlapping, each user observes interference from only other users using the same time-frequency blocks. The intra-cell interference may be controlled by properly assigning physical channels to users.

In general, users may be assigned physical channels based on various factors such as spatial compatibility, received SNR, QoS requirements, handoff status, and so on. For common overlapping, base channels x in the L channel sets may be assigned to spatially compatible users that can be separated using receiver spatial processing techniques. For both random and common overlapping, users may be assigned physical channels based on their received SNRs. For example, better performance may be achieved by overlapping a low SNR user with a high SNR user. The low SNR user may be able to form a beam null toward the high SNR user, and the high SNR user may be able to ignore the interference from the low SNR user. For the channel structures shown in FIGS. 4 through 6, low SNR users may be assigned physical channels in channel set 1, and high SNR users may be assigned physical channels in channel set 2. Users with high QoS requirements may be assigned (1) common overlapping physical channels with no other users sharing these physical channels or (2) random overlapping physical channels that share time-frequency blocks with low SNR users. The high QoS users may be users that cannot tolerate delay jitter due to an incremental redundancy transmission scheme such as HARQ.

The QODA system can support handoff users in various manners. A handoff user may be a soft handoff user or a softer handoff user. A soft handoff user is a user that communicates with multiple cells and may be handed off from a serving cell to a handoff cell. A softer handoff user is a user that communicates with multiple sectors within the same cell and may be handed off from a serving sector to a handoff sector. A handoff user typically achieves low SNRs at both sectors/cells.

In an embodiment, handoff users are assigned physical channels in the same manner as non-handoff users. The handoff users can overlap with non-handoff users gracefully without causing excessive interference via use of receiver spatial processing techniques. For a softer handoff user, the serving and handoff sectors each attempt to detect the transmission from the user using receiver spatial processing techniques. The detected symbols from both sectors are then combined, demodulated, and decoded to obtain decoded data for the user. For a soft handoff user, the serving and handoff cells each attempt to detect, demodulate, and decode the transmission from the user. The cell that correctly decodes the data for the user provides the decoded data for the user.

In another embodiment, handoff users are assigned physical channels in a shared channel subset that is reserved for these users. The shared channel subset is used by neighboring sectors/cells. The base channels in the shared channel subset are orthogonal to one another and are also orthogonal to all other physical channels used by the neighboring sectors/cells. A handoff user may be assigned a physical channel in the shared channel subset and would then be orthogonal to all other users in the neighboring sectors/cells. A network entity may coordinate the handoff users and may assign physical channels in the shared channel subset to these users. The physical channels in the shared channel subset may also be partitioned into multiple shared channel groups. These channel groups may be assigned to different sectors within a cell or to different cells. Each sector/cell may then assign the physical channels in its shared channel group to its handoff users.

In yet another embodiment, handoff is achieved by using one copy of the channel set in each sector of a cell and processing all received signals from multiple sectors jointly. Given an L-sector cell, L channel sets may be formed with L copies of a channel tree, e.g., as illustrated in FIG. 4, where each channel set may be used by one sector. The intra-cell interference may be separated using receiver spatial processing techniques.

The channel structures described herein have various features, including:
1. Orthogonality among system resources assigned to the same user;
2. Orthogonality among resources assigned to users that are not well separated;
3. Interference diversity for overlapping users;
4. Flexible tradeoff between intra-cell interference level and resource reuse factor;
5. Support of common overlapping for users that are well separated; and
6. Support of softer handoff.

For the forward link, a base station can transmit a pilot from all of its antennas on a sufficient number of subbands and symbol periods to provide good channel estimation performance for the forward link. The pilot transmissions from the base station antennas may be orthogonalized in time, frequency, code and/or some other domain to allow the terminals to distinguish each base station antenna. For example, the pilot transmission from each base station antenna may be generated with a different orthogonal sequence, e.g., a Walsh code or an OVSF code. Each terminal can estimate the forward link channel response from the base station antennas to the terminal antenna(s) based on the pilot transmissions from the base station.

For the reverse link, each terminal may transmit a pilot from all or a subset of its antenna(s) to allow the base station to estimate the reverse link channel response from the terminal antenna(s) to the base station antennas. The performance of all users, and especially overlapping users and handoff users, is dependent on the quality of the RL channel estimates for the users. For overlapping and handoff users, the RL channel estimates are used for receiver spatial processing to separate out the transmissions from multiple users on the same time-frequency block. Channel estimation errors cause residual errors (or crosstalk) in the separation of the multiple transmissions. The residual errors represent a noise floor that can potentially degrade SNR.

An exemplary pilot design that can support overlapping and handoff users and provide good channel estimation performance is described below. In an embodiment, the L channel sets are associated with L different orthogonal pilot patterns, one pilot pattern for each channel set. Each pilot pattern is a sequence of P values, where P>1, and is denoted as $\{w_l\}=[w_{l,1}, w_{l,2}, \ldots, w_{l,P}]$, for $l=1, \ldots, L$. For example, pilot sequence 1 may be defined as $w_{l,i}=e^{-j2\pi \cdot (l-1) \cdot (i-1)/P}$, for $i=1, \ldots, P$. Other orthogonal sequences or codes may also be used for the pilot patterns.

The pilots transmitted by users in one sector act as interference to the pilots transmitted by users in other sectors of the same cell. To reduce intra-cell pilot interference, the sectors in the same cell may be assigned different scrambling patterns, one scrambling pattern for each sector. Each sector-specific scrambling pattern is a sequence of P values and is denoted as $\{x_s\}=[x_{s,1}, x_{s,2}, \ldots, x_{s,P}]$, for $s=1, \ldots, S$, where S is the number of sectors in the cell. The S sector-specific scrambling patterns are selected to provide good channel estimation performance under various channel and operating conditions. These scrambling patterns may be obtained, e.g., based on a search of a large number of possible scrambling patterns. For example, an exhaustive search of 10,000 sequences may yield a few "good" scrambling sequences where the channel estimation floor is well below the interference from other sources.

To randomize inter-cell pilot interference, neighboring cells may be assigned different scrambling patterns, one scrambling pattern for each cell. Each cell-specific scrambling pattern is a sequence of P values and is denoted as $\{y_c\}=[y_{c,1}, y_{c,2}, \ldots, y_{c,P}]$, for $c=1, 2, \ldots$. The cell-specific scrambling patterns are selected to differ substantially for neighboring cells (e.g., to have good cross-correlation property so that an interfering pilot appears as random as possible) and to provide good channel estimation performance. Optimization of a large number of cell scrambling sequences may be quite complex as the number of neighboring cells increases. Random sequences typically provide good performance.

An overall pilot pattern for a user assigned with a physical channel in channel set l and communicating with sector s in cell c may be denoted as $\{p_{l,s,c}\}=[p_{l,s,c,1}, p_{l,s,c,2}, \ldots, p_{l,s,c,P}]$, where $p_{l,s,c,i}=w_{l,i} \cdot x_{s,i} \cdot y_{c,i}$ for $i=1, \ldots, P$. The sector-specific scrambling may be used if more than one channel set is used by the sectors and may be omitted otherwise. The sector-specific scrambling pattern $\{x_s\}$ may be a sequence of all ones if sector-specific scrambling is not used. Similarly, the cell-specific scrambling pattern $\{y_c\}$ may be a sequence of all ones if cell-specific scrambling is not used.

Each user forms an overall pilot pattern $\{p_{l,s,c}\}$ based on the pilot pattern $\{w_l\}$ associated with the assigned physical channel, the scrambling pattern $\{x_s\}$ for its sector, and the scrambling pattern $\{y_c\}$ for its cell. Since each channel set is associated with one pilot pattern, a channel assignment conveys both the assigned physical channel and the pilot pattern. Each user may transmit a pilot on a portion of each time-frequency block for the assigned physical channel using its overall pilot pattern $\{p_{l,s,c}\}$. The pilots from all users sharing a given time-frequency block in the same sector are orthogonal to one another because of the orthogonal pilot patterns used by these users. If sector-specific scrambling is used, then the pilots from users in each sector are pseudo-random with respect to the pilots from users in other sectors of the same cell. If cell-specific scrambling is used, then the pilots from users in each cell are pseudo-random with respect to the pilots from users in neighboring cells. A sector can process the pilot transmission from a user, remove both the cell-specific scrambling and the sector-specific scrambling, and match (e.g., multiply and accumulate) the pilot pattern for that user to obtain a reverse link channel response estimate for the user. The orthogonal pilot patterns allow the sector to differentiate the channel responses of overlapping users using the same time-frequency block.

A user may transmit a pilot on one or more subbands and in a sufficient number of symbol periods in each time-frequency block used by the assigned physical channel. The rate of pilot transmission is determined by the coherence time and the coherence bandwidth of the communication link. For example, the user may transmit a pilot on one cluster of subbands and symbol periods in each time-frequency block or on multiple clusters that are distributed throughout (e.g., at the four corners) of the time-frequency block.

A user may be equipped with (1) a single antenna that may be used for both data transmission and reception, (2) a single transmit antenna and multiple receive antennas, or (3) multiple transmit and receive antennas. For case (3), the user may transmit a pilot in a manner to allow the sector to estimate the channel response for each transmit antenna. A user with N transmit antennas may be treated in similar manner as N users with a single antenna.

In an embodiment, a handoff user is assigned a pilot pattern that is orthogonal to the pilot patterns used by non-handoff users in order to improve channel estimation performance for the handoff user. The handoff user typically has weaker signals to the serving and handoff sectors and may also be less tolerant to interference from other users. A subset of pilot patterns may be reserved for handoff users. This reserved subset is used by all sectors of the same cell, e.g., in similar manner as the shared channel subset described above. Each pilot pattern in the reserved subset may be assigned to one handoff user. The pilot from each handoff user would then be orthogonal to the pilots from other users in the same cell.

The channel structures described herein facilitate both the mapping of physical channels to system resources and the assignment of physical channels to users. The channel structures may be used for both the forward and reverse links. The same or different system resources may be available for data transmission on the forward and reverse links. The same or different channel structures may be used for the forward and reverse links. For simplicity, portions of the description herein assume that the same system resources are available for both links and that the same channel structure is used for both links.

Figure 10:
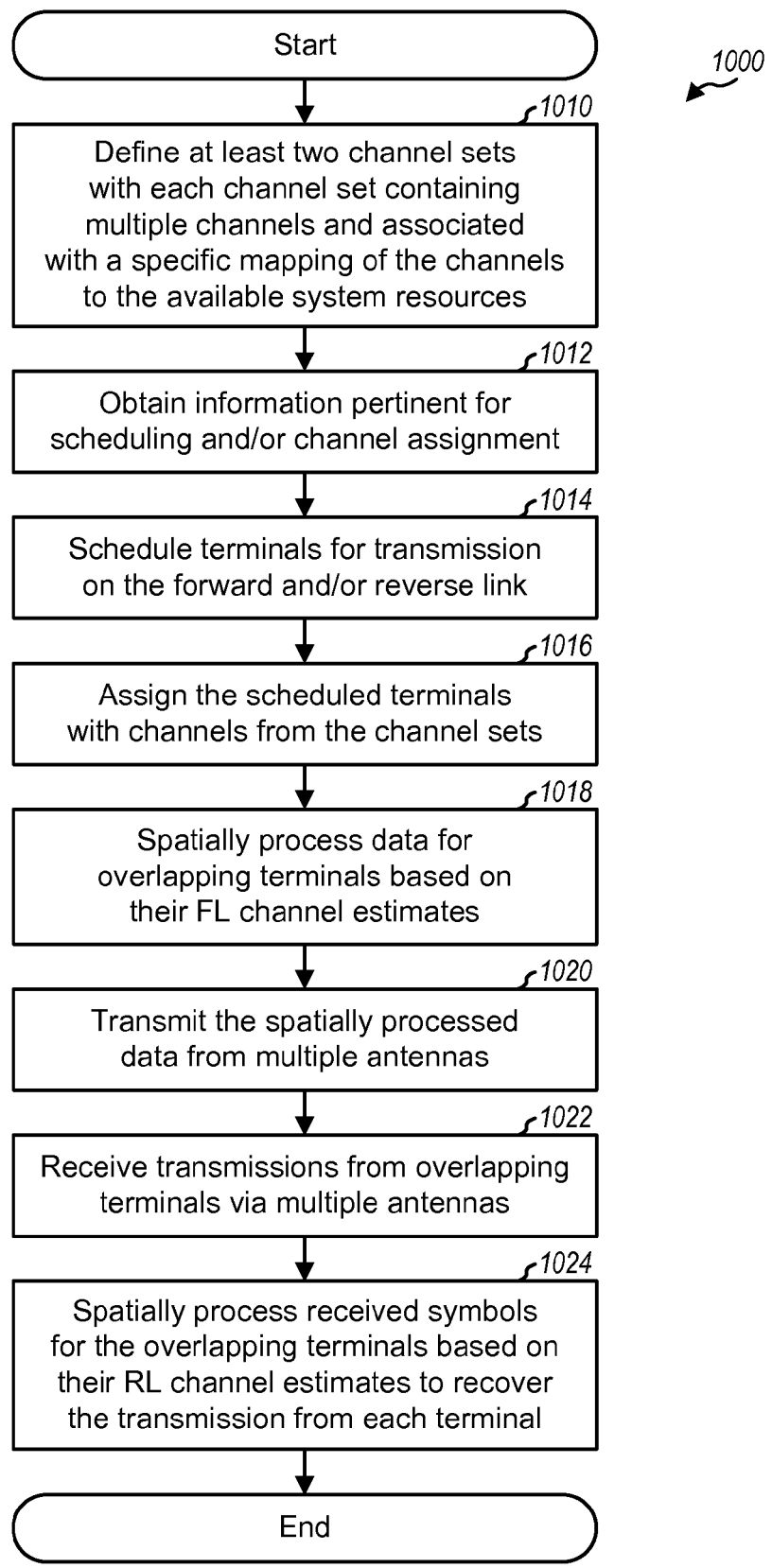
FIG. 10 shows a process for assigning system resources.

FIG. 10 shows a process 1000 for assigning system resources and transmitting data in the QODA system. Initially, a channel structure with at least two channel sets is defined, with each channel set containing multiple physical channels and associated with a specific mapping of the physical channels to the available system resources (block 1010). Block 1010 may be implicitly performed for a static channel structure and explicitly performed for an adaptive/dynamic channel structure. The mapping for each channel set is pseudo-random with respect to the mapping for each of the remaining channel sets for at least a subset of the physical channels. Each channel set may be defined based on a channel tree having a hierarchical structure, as described above.

In each scheduling interval, information that is pertinent for scheduling and/or channel assignment is obtained (block 1012). The pertinent information may include, e.g., channel estimates, SNR estimates, QoS requirements, handoff status, and so on. Terminals are scheduled for transmission on the forward and/or reverse link (block 1014). The scheduled terminals are assigned physical channels from the channel sets (block 1016). The scheduling and/or channel assignment may be based on the collected information for the terminals. For example, the channel estimates, SNR estimates, and/or QoS requirements may be used to arrange the terminals into group, to overlap spatially compatible terminals, to isolate handoff terminals, and so on. A handoff terminal may be assigned a physical channel that is orthogonal to the physical channels for non-handoff users in the same cell and may further be assigned a pilot pattern that is orthogonal to the pilot patterns for the non-handoff users. Channel assignments are formed and sent to the scheduled terminals.

For the forward link, data for overlapping terminals are spatially processed (e.g., for beamforming) based on their FL channel estimates, as described below (block 1018), and then transmitted from multiple base station antennas (block 1020). For the reverse link, multiple transmissions from overlapping terminals are received via the multiple base station antennas (block 1022). The received symbols for the overlapping terminals are spatially processed (e.g., for spatial matched filtering) based on their RL channel estimates to recover the transmission from each terminal (block 1024).

On the forward link, a base station may transmit data to multiple users in each time-frequency block via multiple antennas. The base station may steer each FL transmission toward a target user based on the channel estimate for that user. For simplicity, the following description is for one time-frequency block, the base station is assumed to have multiple (T) antennas, and each terminal is assumed to have a single antenna.

A multiple-input single-output (MISO) channel is formed between the T antennas at the base station and the single antenna at a terminal u. The MISO channel may be characterized by a T×1 channel response vector $h_{fl,u}(k,t)$, which may be expressed as:

$$\underline{h}_{fl,u}(k,t)=[h_{u,1}(k,t)h_{u,2}(k,t)\ldots h_{u,T}(k,t)]^T \quad \text{Eq (1)}$$

where $h_{u,j}(k,t)$, for j=1, ..., T, is the complex channel gain from base station antenna j to the terminal antenna for subband k in time slot t, and "$T$" denotes a transpose.

The base station may transmit data to up to L terminals on the same time-frequency block using the L channel sets. In general, the number of terminals that may be transmitted to on the same time-frequency block is limited by the number of antennas at the base station, so that L≤T. For simplicity, the following description assumes that the base station transmits to L terminals on each time-frequency block.

An FL multiple-input multiple-output (MIMO) channel is formed between the T base station antennas and the L antennas at the L terminals. The FL MIMO channel may be characterized by a T×L channel response matrix $\underline{H}_{fl}(k,t)$, which may be expressed as:

$$\underline{H}_{fl}(k,t)=[\underline{h}_{fl,1}(k,t)\underline{h}_{fl,2}(k,t)\ldots \underline{h}_{fl,L}(k,t)] \quad \text{Eq (2)}$$

Each column of $\underline{H}_{fl}(k,t)$ corresponds to an FL channel response vector for one terminal The base station may perform transmitter spatial processing (or beamforming) for the data transmissions to the L terminals, as follows:

$$\underline{x}_{fl}(k,t,n)=\underline{H}^*_{fl}(k,t)\cdot \underline{s}_{fl}(k,t,n) \quad \text{Eq (3)}$$

where $\underline{s}_{fl}(k,t,n)$ is an L×1 vector with L data symbols to be sent to the L terminals on subband k in symbol period n of time slot t;

$\underline{x}_{fl}(k,t,n)$ is a T×1 vector with T transmit symbols to be sent from the T base station antennas on subband k in symbol period n of time slot t; and "*" denotes a conjugate.

For simplicity, the scaling for the data symbols transmitted to the L terminals is omitted in equation (3). Time slot t may span one or multiple symbol periods. For simplicity, the channel response is assumed to be constant over time slot t and is not a function of symbol period n. The channel response matrix $\underline{H}_{fl}(k,t)$ is dependent on the specific set of terminals assigned to subband k in time slot t. The terminals overlapping each time-frequency block may be selected such that their channel response vectors are spatially decorrelated, e.g., are as orthogonal to one another as possible. The beamforming may also be performed in other manners, e.g., based on zero-forcing (ZF), maximal ratio combining (MRC), minimum mean square error (MMSE), or some other techniques.

For the reverse link, the base station may receive RL transmissions from up to L terminals on each time-frequency block via the T antennas. In general, the number of terminals that may transmit on the same time-frequency block is limited by the number of antennas at the base station, which determines the base station's ability to separate out the RL transmissions, so that L≤T. For simplicity, the following description assumes that the base station receives transmissions from L terminals on each time-frequency block.

A single-input multiple-output (SIMO) channel is formed between the single antenna at each terminal and the T antennas at the base station. The SIMO channel for each terminal may be characterized by a T×1 channel response vector $\underline{h}_{rl,u}(k,t)$ having the form shown in equation (1). An RL MIMO channel is formed between the L antennas at the L terminals and the T base station antennas. The RL MIMO channel may be characterized by a T×L channel response matrix $\underline{H}_{rl}(k,t)$, which may be expressed as:

$$\underline{H}_{rl}(k,t)=[\underline{h}_{rl,1}(k,t)\underline{h}_{rl,2}(k,t)\ldots \underline{h}_{rl,L}(k,t)] \quad \text{Eq (4)}$$

Each column of $\underline{H}_{rl}(k,t)$ corresponds to an RL channel response vector for one terminal. The channel response matrix $\underline{H}_{rl}(k,t)$ is dependent on the specific set of terminals assigned to subband k in time slot t.

The base station obtains received symbols from the T antennas for the RL transmissions from the L terminals, which may be expressed as:

$$\underline{r}(k,t,n)=\underline{H}_{rl}(k,t)\cdot \underline{s}_{rl}(k,t,n)+\underline{n}(k,t,n) \quad \text{Eq (5)}$$

where $\underline{s}_{r,l}(k,t,n)$ is an L×1 vector with L data symbols sent by the L terminals on subband k in symbol period n of time slot t;

$\underline{r}(k,t,n)$ is a T×1 vector with T received symbols obtained via the T base station antennas for subband k in symbol period n of time slot t; and $\underline{n}(k,t,n)$ is a noise vector for subband k in symbol period n of time slot t.

For simplicity, the noise may be assumed to be additive white Gaussian noise (AWGN) with a zero mean vector and a covariance matrix of $\underline{\phi}_{nn}=\sigma^2 \cdot \underline{I}$, where $\sigma^2$ is the variance of the noise and $\underline{I}$ is the identity matrix.

The base station may use various receiver spatial processing techniques to separate out the RL transmissions sent by the L terminals on the same time-frequency block. These receiver spatial processing techniques include a zero-forcing (ZF) technique, a minimum mean square error (MMSE) technique, a maximal ratio combining (MRC) technique, and so on. The base station may derive a spatial filter matrix based on the ZF, MMSE, or MRC technique, as follows:

$$\underline{M}_{zf}(k,t)=[\underline{H}_{rl}^H(k,t) \cdot \underline{H}_{rl}(k,t)]^{-1} \cdot \underline{H}_{rl}^H(k,t) \qquad \text{Eq (6)}$$

$$\underline{M}_{mmse}(k,t)=\underline{D}_{mmse}(k,t) \cdot [\underline{H}_{rl}^H(k,t) \cdot \underline{H}_{rl}(k,t)+\sigma^2 \cdot \underline{I}]^{-1} \cdot \underline{H}_{rl}^H(k,t) \qquad \text{Eq (7)}$$

$$\underline{M}_{mrc}(k,t)=\underline{D}_{mrc}(k,t) \cdot \underline{H}_{rl}^H(k,t) \qquad \text{Eq (8)}$$

where $\underline{D}_{mmse}(k,t)=\text{diag}\{[\underline{H}_{rl}^H(k,t) \cdot \underline{H}_{rl}(k,t)+\sigma^2 \cdot \underline{I}]^{-1} \cdot \underline{H}_{rl}^H(k,t) \cdot \underline{H}_{rl}(k,t)\}^{-1}$; and $\underline{D}_{mrc}(k,t)=\text{diag}[\underline{H}_{rl}^H(k,t) \cdot \underline{H}_{rl}(k,t)]^{-1}$.

The base station derives an estimate of $\underline{H}_{rl}(k,t)$ based on the pilots transmitted by the L terminals. For simplicity, equations (6) through (8) assume no channel estimation error.

The base station may perform receiver spatial processing as follows:

$$\hat{\underline{s}}_{rl}(k,t,n) = \underline{M}(k,t) \cdot \underline{r}(k,t,n), \qquad \text{Eq (9)}$$
$$= \underline{s}_{rl}(k,t,n) + \underline{\tilde{n}}(k,t,n),$$

where $\underline{M}(k,t)$ may be equal to $\underline{M}_{zf}(k,t)$, $\underline{M}_{mmse}(k,t)$, or $\underline{M}_{mrc}(k,t)$;

$\hat{\underline{s}}_{rl}(k,t,n)$ is an L×1 vector with L detected symbols for subband k in symbol period n of time slot t; and $\underline{\tilde{n}}(k,t,n)$ is the noise after the receiver spatial processing.

A detected symbol is an estimate of a transmitted data symbol.

For simplicity, the description above assumes that each terminal is equipped with a single antenna. A terminal equipped with multiple (R) antennas may receive multiple FL transmissions on the same time-frequency block via the R antennas and may also send multiple RL transmissions on the same time-frequency block from these R antennas. Matrix $\underline{H}_{fl}(k,t)$ would contain a column for each terminal antenna used to receive an FL transmission. Matrix $\underline{H}_{rl}(k,t)$ would contain a column for each terminal antenna used to send an RL transmission.

Figure 11:
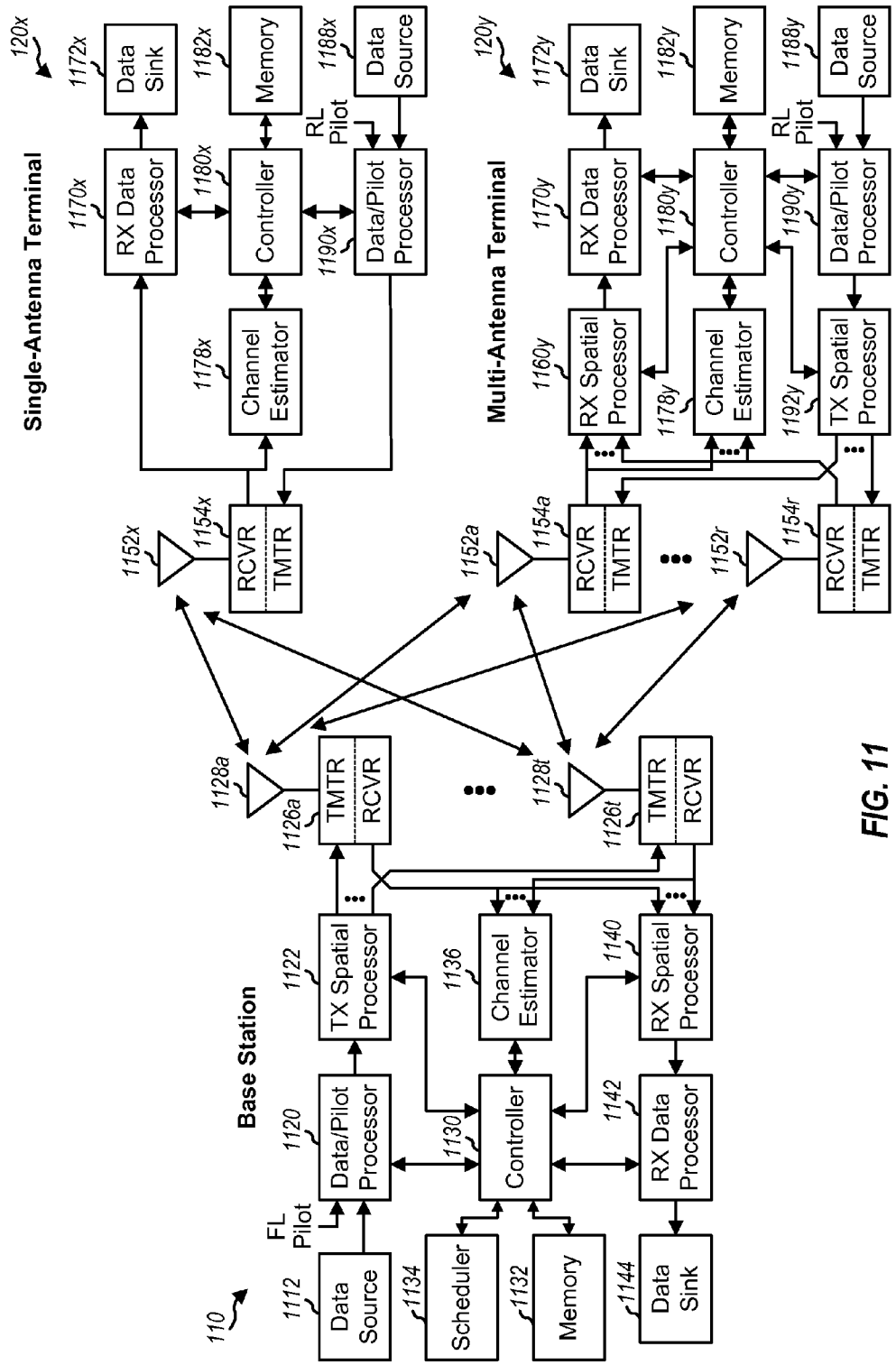
FIG. 11 shows a block diagram of a base station and two terminals.

FIG. 11 shows an embodiment of base station 110 and two terminals 120x and 120y in QODA system 100. Base station 110 is equipped with multiple (T) antennas 1128a through 1128t, terminal 120x is equipped with a single antenna 1152x, and terminal 120y is equipped with multiple (R) antennas 1152a through 1152r.

On the forward link, at base station 110, a data/pilot processor 1120 receives traffic data from a data source 1112 for all scheduled terminals and signaling (e.g., channel assignments) from a controller 1130. Data/pilot processor 1120 encodes, interleaves, and symbol maps the traffic data and signaling to generate data symbols and further generates pilot symbols for the forward link. As used herein, a data symbol is a modulation symbol for traffic/packet data, a pilot symbol is a symbol for pilot (which is data that is known a priori by both the transmitter and receiver), a modulation symbol is a complex value for a point in a signal constellation for a modulation scheme (e.g., M-PSK or M-QAM), and a symbol is any complex value. A transmit (TX) spatial processor 1122 performs spatial processing on the data symbols (e.g., as shown in equation (3)), multiplexes in the pilot symbols, and provides transmit symbols to transmitter units (TMTR) 1126a through 1126t. Each transmitter unit 1126 processes its transmit symbols (e.g., for OFDM) and generates an FL modulated signal. The FL modulated signals from transmitter units 1126a through 1126t are transmitted from antennas 1128a through 1128t, respectively.

At each terminal 120, one or multiple antennas 1152 receive the transmitted FL modulated signals, and each antenna provides a received signal to a respective receiver unit (RCVR) 1154. Each receiver unit 1154 performs processing complementary to the processing performed by transmitter units 1126 and provides received symbols. For each terminal, a channel estimator 1178 derives an FL channel estimate based on the pilot received from base station 110. For multi-antenna terminal 120y, a receive (RX) spatial processor 1160y performs receiver spatial processing on the received symbols with the FL channel estimate and provides detected symbols. An RX data processor 1170 symbol demaps, deinterleaves, and decodes the received or detected symbols, provides decoded data to a data sink 1172, and provides detected signaling (e.g., for a channel assignment) to a controller 1180.

On the reverse link, traffic data from a data source 1188 and signaling (e.g., ACK/NAK) to be sent by each terminal 120 are processed by a data/pilot processor 1190, further processed by a TX spatial processor 1192 if multiple antennas are present, conditioned by transmitter unit(s) 1154, and transmitted from antenna(s) 1152. At base station 110, the transmitted RL modulated signals from terminals 120 are received by antennas 1128 and conditioned by receiver units 1126 to obtain received symbols. A channel estimator 1136 derives an RL channel estimate for each terminal 120 based on the pilot received from that terminal. An RX spatial processor 1140 performs receiver spatial processing on the received symbols with the RL channel estimates for all the terminals (e.g., as shown in equation (9)) and provides detected symbols. An RX data processor 1142 then symbol demaps, deinterleaves, and decodes the detected symbols, provides decoded data to a data sink 1144, and provides detected signaling to controller 1130.

Controllers 1130, 1180x and 1180y control the operation of various processing units at base station 110 and terminals 120x and 120y, respectively. Memory units 1132, 1182x and 1182y store data and program codes used by controllers 1130, 1180x and 1180y, respectively. A scheduler 1134 schedules terminals for data transmission on the forward and reverse links and assigns physical channels to the scheduled terminals. Scheduler 1134 or some other network entity may assign physical channels and pilot patterns to handoff users. Controller 1130 may form and send channel assignments for the scheduled terminals.

The techniques described herein may be implemented by various means. For example, these techniques may be implemented in hardware, software, or a combination thereof. For a hardware implementation, the processing units used to schedule terminals, assign channels, and perform spatial processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the transmission techniques may be implemented with modules (e.g., procedures, functions, and so on) that perform the functions described herein. The software codes may be stored in a memory unit (e.g., memory unit 1132, 1182$x$ or 1182$y$ in FIG. 11) and executed by a processor (e.g., controller 1130, 1180$x$ or 1180$y$). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of assigning system resources in a communication system, comprising:
    scheduling a L quantity of terminals for data transmission;
    assigning the L quantity of terminals with channels in at least two channel sets, wherein each channel set comprises a plurality of channels and is associated with a specific mapping of the plurality of channels to system resources available for data transmission, wherein the mapping for each channel set is pseudo-random with respect to the mapping for each remaining one of the at least two channel sets for at least a subset of the plurality of channels, and the mapping of the subset of the plurality of channels uses a different overlapping scheme than a mapping of at least one other subset of the plurality of channels in the same channel set, wherein each channel set is defined based on a channel tree and wherein each channel in the channel tree that is assigned to a terminal of the L quantity of terminals restricts at least on other channel in the same channel tree from being assigned; and
    transmitting the plurality of channels to multiple users in each time-frequency block using a T quantity of antennas, wherein the L quantity is less than or equal to the T quantity.

2. The method of claim 1, further comprising defining the mapping for each channel set to be common with respect to the mapping for each remaining one of the at least two channel sets for at least one of the plurality of channels.

3. The method of claim 2, further comprising assigning a handoff terminal with a channel that is orthogonal to channels for non-handoff terminals.

4. The method of claim 3, further comprising selecting at least two terminals for overlapping transmissions based on channel estimates, signal-to-noise-and-interference ratio (SNR) estimates, quality of service (QoS) requirements, or a combination thereof.

5. The method of claim 1, further comprising:
    receiving a plurality of data transmissions from the at least two terminals using the T quantity of antennas; and
    performing receiver spatial processing on received symbols from the T quantity of antennas based on channel estimates for the at least two terminals to recover the plurality of transmissions.

6. The method of claim 5 wherein the each channel in the channel tree is mapped to an available resource using frequency hopping.

7. The method of claim 5 wherein the plurality of channels comprises some overlapping portions.

8. The method of claim 5 wherein each channel set is associated with a different channel tree of at least two channel trees.

9. The method of claim 1 wherein the scheduling step comprises scheduling the L quantity of terminals utilizing only one channel tree of at least two channel trees or utilizing each of the at least two channel trees.

10. The method of claim 9 wherein each of the at least two channel trees has a different loading factor.

11. An apparatus of assigning system resources in a communication system, comprising:
    a scheduler for scheduling a L quantity of terminals for data transmission;
    a controller for assigning the L quantity of terminals with channels in at least two channel sets, wherein each channel set comprises a plurality of channels and is associated with a specific mapping of the plurality of channels to system resources available for data transmission, wherein the mapping for each channel set is pseudo-random with respect to the mapping for each remaining one of the at least two channel sets for at least a subset of the plurality of channels, and the mapping of the subset of the plurality of channels uses a different overlapping scheme than a mapping of at least one other subset of the plurality of channels in the same channel set, wherein each channel set is defined based on a channel tree and wherein each channel in the channel tree that is assigned to a terminal of the L quantity of terminals restricts at least on other channel in the same channel tree from being assigned; and
    a transmitter for transmitting the plurality of channels to multiple users in each time-frequency block using a T quantity of antennas, wherein the L quantity is less than or equal to the T quantity.

12. The apparatus of claim 11, wherein the controller further defines the mapping for each channel set to be common with respect to the mapping for each remaining one of the at least two channel sets for at least one of the plurality of channels.

13. The apparatus of claim 12, wherein the controller further assigns a handoff terminal with a channel that is orthogonal to channels for non-handoff terminals.

14. The apparatus of claim 13, wherein the controller further selects at least two terminals for overlapping transmissions based on channel estimates, signal-to-noise-and -interference ratio (SNR) estimates, quality of service (QoS) requirements, or a combination thereof.

15. The apparatus of claim 11, further comprising:
    a receiver for receiving a plurality of data transmissions from the at least two terminals using the T quantity of antennas; and
    a receive spatial processor for performing receiver spatial processing on received symbols from the T quantity of antennas based on channel estimates for the at least two terminals to recover the plurality of transmissions.

16. The apparatus of claim 15 wherein the each channel in the channel tree is mapped to an available resource using frequency hopping.

17. The apparatus of claim 15 wherein the plurality of channels comprises some overlapping portions.

18. The apparatus of claim 15 wherein each channel set is associated with a different channel tree of at least two channel trees.

19. The apparatus of claim 11 wherein the scheduling step comprises scheduling the L quantity of terminals utilizing only one channel tree of at least two channel trees or utilizing each of the at least two channel trees.

20. The apparatus of claim 19 wherein each of the at least two channel trees has a different loading factor.

21. An apparatus of assigning system resources in a communication system, comprising:
 means for scheduling a L quantity of terminals for data transmission;
 means for assigning the L quantity of terminals with channels in at least two channel sets, wherein each channel set comprises a plurality of channels and is associated with a specific mapping of the plurality of channels to system resources available for data transmission, wherein the mapping for each channel set is pseudo-random with respect to the mapping for each remaining one of the at least two channel sets for at least a subset of the plurality of channels, and the mapping of the subset of the plurality of channels uses a different overlapping scheme than a mapping of at least one other subset of the plurality of channels in the same channel set, wherein each channel set is defined based on a channel tree and wherein each channel in the channel tree that is assigned to a terminal of the L quantity of terminals restricts at least on other channel in the same channel tree from being assigned; and
 means for transmitting the plurality of channels to multiple users in each time-frequency block using a T quantity of antennas, wherein the L quantity is less than or equal to the T quantity.

22. The apparatus of claim 21, further comprising means for defining the mapping for each channel set to be common with respect to the mapping for each remaining one of the at least two channel sets for at least one of the plurality of channels.

23. The apparatus of claim 22, further comprising means for assigning a handoff terminal with a channel that is orthogonal to channels for non-handoff terminals.

24. The apparatus of claim 23, further comprising means for selecting at least two terminals for overlapping transmissions based on channel estimates, signal-to-noise-and -interference ratio (SNR) estimates, quality of service (QoS) requirements, or a combination thereof.

25. The apparatus of claim 21, further comprising:
 means for receiving a plurality of data transmissions from the at least two terminals using the T quantity of antennas; and
 means for performing receiver spatial processing on received symbols from the T quantity of antennas based on channel estimates for the at least two terminals to recover the plurality of transmissions.

26. The apparatus of claim 25 wherein the each channel in the channel tree is mapped to an available resource using frequency hopping.

27. The apparatus of claim 25 wherein the plurality of channels comprises some overlapping portions.

28. The apparatus of claim 25 wherein each channel set is associated with a different channel tree of at least two channel trees.

29. The apparatus of claim 21 wherein the scheduling step comprises scheduling the L quantity of terminals utilizing only one channel tree of at least two channel trees or utilizing each of the at least two channel trees.

30. The apparatus of claim 29 wherein each of the at least two channel trees has a different loading factor.

31. A non-transitory computer-readable medium storing a computer program, wherein execution of the computer program is for:
 scheduling a L quantity of terminals for data transmission;
 assigning the L quantity of terminals with channels in at least two channel sets, wherein each channel set comprises a plurality of channels and is associated with a specific mapping of the plurality of channels to system resources available for data transmission, wherein the mapping for each channel set is pseudo-random with respect to the mapping for each remaining one of the at least two channel sets for at least a subset of the plurality of channels, and the mapping of the subset of the plurality of channels uses a different overlapping scheme than a mapping of at least one other subset of the plurality of channels in the same channel set, wherein each channel set is defined based on a channel tree and wherein each channel in the channel tree that is assigned to a terminal of the L quantity of terminals restricts at least on other channel in the same channel tree from being assigned; and
 transmitting the plurality of channels to multiple users in each time-frequency block using a T quantity of antennas, wherein the L quantity is less than or equal to the T quantity.

32. The computer-readable medium of claim 31, wherein execution of the computer program is also for defining the mapping for each channel set to be common with respect to the mapping for each remaining one of the at least two channel sets for at least one of the plurality of channels.

33. The computer-readable medium of claim 32, wherein execution of the computer program is also for assigning a handoff terminal with a channel that is orthogonal to channels for non-handoff terminals.

34. The computer-readable medium of claim 33, wherein execution of the computer program is also for selecting at least two terminals for overlapping transmissions based on channel estimates, signal-to-noise-and-interference ratio (SNR) estimates, quality of service (QoS) requirements, or a combination thereof.

35. The computer-readable medium of claim 31, wherein execution of the computer program is also for:
 receiving a plurality of data transmissions from the at least two terminals using the T quantity of antennas; and
 performing receiver spatial processing on received symbols from the T quantity of antennas based on channel estimates for the at least two terminals to recover the plurality of transmissions.

36. The computer-readable medium of claim 35 wherein the each channel in the channel tree is mapped to an available resource using frequency hopping.

37. The computer-readable medium of claim 35 wherein the plurality of channels comprises some overlapping portions.

38. The computer-readable medium of claim 35 wherein each channel set is associated with a different channel tree of at least two channel trees.

39. The computer-readable medium of claim 31 wherein the scheduling step comprises scheduling the L quantity of terminals utilizing only one channel tree of at least two channel trees or utilizing each of the at least two channel trees.

40. The computer-readable medium of claim 39 wherein each of the at least two channel trees has a different loading factor.

* * * * *